United States Patent
Hu et al.

(10) Patent No.: US 7,263,530 B2
(45) Date of Patent: Aug. 28, 2007

(54) APPARATUS FOR AND METHOD OF SUMMARISING TEXT

(75) Inventors: Jiawei Hu, Bracknell (GB); William George Imlah, Bracknell (GB)

(73) Assignee: Canon Kabushiki Kaisha, Tokyo (JP)

(*) Notice: Subject to any disclaimer, the term of this patent is extended or adjusted under 35 U.S.C. 154(b) by 520 days.

(21) Appl. No.: 10/797,107

(22) Filed: Mar. 11, 2004

(65) Prior Publication Data

US 2004/0225667 A1 Nov. 11, 2004

(30) Foreign Application Priority Data

Mar. 12, 2003 (GB) ................. 0305672.8

(51) Int. Cl.
G06F 17/30 (2006.01)
(52) U.S. Cl. ............... 707/102; 707/3; 707/4; 707/5
(58) Field of Classification Search ...... None
See application file for complete search history.

(56) References Cited

U.S. PATENT DOCUMENTS

| | | | |
|---|---|---|---|
| 5,644,776 A | 7/1997 | DeRose et al. ......... | 395/761 |
| 5,708,825 A | 1/1998 | Sotomayor ............ | 395/762 |
| 5,918,240 A | 6/1999 | Kupiec et al. ......... | 707/531 |
| 5,924,108 A | 7/1999 | Fein et al. ............. | 707/531 |
| 6,167,368 A | 12/2000 | Wacholder ............ | 704/9 |
| 6,185,592 B1 | 2/2001 | Boguraev et al. ...... | 707/531 |
| 6,353,824 B1 | 3/2002 | Boguraev et al. ...... | 707/5 |
| 6,594,658 B2* | 7/2003 | Woods .................. | 707/5 |
| 6,789,230 B2* | 9/2004 | Katariya et al. ....... | 715/531 |

(Continued)

FOREIGN PATENT DOCUMENTS

EP 1 033 662 A2 9/2000

(Continued)

OTHER PUBLICATIONS

J. Vergne, "Tutorial: Trends in Robust Parsing", Jul. 29, 2000, Coling 2000, available at http:users.info.unicaen.fr/~jvergne/tutorialColing2000.html and http:users.info.unicaen.fr/~jvergne/RobustParsingCourseSlides.pdf.zip.

(Continued)

*Primary Examiner*—Jeffrey Gaffin
*Assistant Examiner*—Tomasz Ponikiewski
(74) *Attorney, Agent, or Firm*—Fitzpatrick, Cella, Harper & Scinto

(57) ABSTRACT

Apparatus for identifying topics of document data has:
  a word ranker (171) for ranking words that are present in or representative of the content of the document data;
  a co-occurrence ranker (172) for ranking co-occurrences of words that are present in or representative of the content of the document data;
  a phrase ranker (170) for ranking phrases in the document data;
  a word selector (174) for selecting the highest ranking words;
  a co-occurrence identifier (176) for identifying which of the highest ranking co-occurrences contain at least one of the highest ranking words;
  a phrase identifier (177) for identifying the phrases containing at least one word from the identified co-occurrences;
  a phrase selector (178) for selecting the highest ranking one or ones of the identified phrases as the topic or topics of the document data; and
  an output device (40) for outputting data relating to the selected topics.

36 Claims, 23 Drawing Sheets

U.S. PATENT DOCUMENTS

| | | | |
|---|---|---|---|
| 2002/0174101 A1* | 11/2002 | Fernley et al. | 707/1 |
| 2002/0184267 A1 | 12/2002 | Nakao | 707/515 |
| 2003/0028558 A1* | 2/2003 | Kawatani | 707/500 |
| 2003/0069877 A1* | 4/2003 | Grefenstette et al. | 707/2 |
| 2004/0029085 A1 | 2/2004 | Hu et al. | 434/178 |

FOREIGN PATENT DOCUMENTS

| | | |
|---|---|---|
| EP | 1 071 023 A2 | 1/2001 |
| EP | 1 217 533 A2 | 6/2002 |
| EP | 1 233 349 A2 | 8/2002 |
| GB | 2 332 544 A | 6/1999 |

OTHER PUBLICATIONS

G.A. Miller et al., "Introduction to WordNet: An On-line Lexical Database", Cognitive Science Laboratory, Princeton University, Aug. 1993, available at http://www.cogsci.princeton.edu/~wn/.

R. Barzilay et al., "Using Lexical Chains for Text Summarization", Proceedings of the Intelligent Scalable Text Summarization Workshop, Madrid, ACU 1997.

R. Barzilay, "Lexical Chains for Summarization", M.Sc. Thesis, Ben-Gurion University of the Negev, Department of Mathematics & Computer Science, Nov. 30, 1997.

H.P Edmundson, "New Methods in Automatic Extracting", pp. 23-33, 36, 37, 40, and 41 of "Advances in Automatic Text Summarisation" by I. Mani et al., 1999.

F.C. Johnson et al., "The application of linguistic processing to automatic abstract generation", Journal of Document & Text Management, vol. 1, No. 3, 1993, pp. 215-241.

B. Boguraev et al., "Dynamic Presentation of Document Content for Rapid On-Line Skimming", AAAI Spring 1998 Symposium on Intelligent Text Summarization.

I. Mani et al., "Multi-document Summarization by Graph Search and Matching", available at http://arxiv.org.PS_cache/cmp-lg/pdf/9712/9712004.pdf, Proceedings of the Fourteenth National Conference on Artificial Intelligence (AAAI'97), Dec. 10, 1997, pp. 622-628.

D. Lawrie et al., "Finding Topic Words for Hierarchical Summarization", SIGIR '01, Sep. 9-12, 2001, New Orleans, LA, pp. 349-357 and presentation slides.

Roget's on-line thesaurus, available at http://humanities.uchicago.edu/orgs/ARTEL/forms_unrest/Roget.html.actual (date unknown).

Swan, R., et al., "TimeMines: Constructing Timelines with Statistical Models of Word Usage", ACM SIGKDD 2000, Workshop on Text Mining, pp. 73-80, CIIR Technical Report IR-213, (2000) available at http://ciir.cs.umass.edu.

"NP Chunking", available at http://lcg-www.uia.ac.be/~erikt/research/np-chunking.html, Sep. 13, 2002.

I. Mani et al., "Automatic Summarization", Chapter 4, John Benjamin Publishing Company, 2001, pp. 77-89.

S. Evert et al., "Methods for Qualitative Evaluation of Lexical Association Measures", Proceedings of the 39th Annual Meeting of the Association for Computational Linguistics, Toulouse, France, 2001.

D. Lin et al., Presentation slides entitled "Collocation", Department of Computing Science, University of Alberta, Feb. 5, 2002.

T. Dunning, "Accurate Methods for the Statistics of Surprise and Coincidence", Computational Linguistics 19(1), 1993, available at http://citeseer.nj.nec.com/dunning93accurate/html.

"The Festival Speech Synthesis System", Section 9.1 of the manual for that system, Nov. 20, 2002, available at http://www.cstr.ed.ac.uk/projects/festival/manual/festival_9.html.

M.A. Hearst, "Multi-Paragraph Segmentation of Expository Text", 32nd Annual Meeting of the Association for Computational Linguistics in 1994, available at http://citeseer.nj.nec.com/hearst94multiparagraph.html.

Armour, T., presentation slides entitled "Asymmetric Threat Initiative", 2000, available at http://www.darpa.mil/darpatech2000/presentations/iso.pdf/4armouratb&wrev1.pdf.

Armour, T., "Asymmetric Threat Initiative", 2000, available at http://www.darpa.mil/body/dar_archives.html.

* cited by examiner

APPARATUS FOR AND METHOD OF SUMMARISING TEXT

This invention relates to apparatus for and methods of automatically summarising text.

The aim of automatic text summarisation is to enable production of summaries that accurately reflect the content of document data so that a user can get an idea of the content of the document data without having to read the document data in its entirety to assist a user in, for example, searching through document data representing a large collection of documents or a very long document to locate a document or document portion relating to a particular topic or topics of interest.

In one aspect, the present invention provides apparatus for identifying topics in document data to be summarised, the apparatus comprising:

- word ranking means for ranking words in order of frequency of occurrence in the document data;
- co-occurrence ranking means for ranking co-occurrences of words in order of significance;
- phrase ranking means for ranking phrases in order of frequency of occurrence in the document data;
- word selecting means for selecting top ranking words;
- co-occurrence identifying means for identifying which of the top ranking co-occurrences contain at least one top ranking word;
- phrase identifying means for identifying the phrases containing at least one word from the selective co-occurrences; and
- phrase selecting means for selecting the top ranking ones of the identified phrases as representing topics of the document data.

Using the co-occurrences and words enables topic phrases to be identified that accurately reflect the content of the document data.

In one aspect, the present invention provides co-occurrence significance calculating apparatus for use in text summarisation apparatus, the co-occurrence significance calculating apparatus comprising:

- co-occurrence determining means for determining word co-occurrences in document data;
- combination identifying means for identifying word co-occurrences representing particular combinations of grammatical categories of words; and
- significance calculating means for calculating significant measures for the identified co-occurrences.

In an embodiment, the categories of words are, noun and verb, noun and noun, noun and proper noun and verb and proper noun plus possibly also proper noun and proper noun.

In an embodiment, the co-occurrence determining means is arranged to determine that words co-occur if they occur in the same text block, for example in the same sentence or in the same phrase, or text delimited by punctuation marks such as commas, parentheses or hyphens.

In an embodiment, the co-occurrence determining means is arranged to determine that words co-occur if one word modifies the other syntactically or semantically.

In an embodiment, the significance calculating means is arranged to calculate a likelihood ratio as the significance measure.

Selecting particular grammatical categories of words such as nouns, verbs and proper nouns for the co-occurrences enables the co-occurrences to be directed towards the information that users are usually interested in, namely issues such as what, where, how, when, etc.

In one aspect, the present invention provides apparatus for searching document data, the apparatus comprising:

- receiving means for receiving query or search terms supplied by a user;
- significance determining means for determining, for each query term, co-occurrences in the document data; and
- output means for outputting parts or portions of the document data containing determined co-occurrences.

In an embodiment, ranking means are provided for ranking text portions (such as sentences) containing the determined co-occurrences in accordance with a scoring function.

In an embodiment, the ranking means is arranged to determine the score the text portions by summing positive terms for each query word in the text portions and adding to the sum a normalised significance factor for each co-occurrence where the normalised significance factor represents the ratio between the likelihood ratios for that co-occurrence and the highest ranking co-occurrence.

In one aspect, the present invention provides apparatus for classifying topics in document data, which apparatus comprises:

- text splitting means for splitting document data into text segments; and
- classifying means for classifying topics in the document data according to their distribution in the text segments so as to define main and subsidiary topics in the document data.

In an embodiment, the classifying means is arranged to determined that a topic is a main topic of the document data if the occurrence of the topic is over a threshold, for example if the topic occurs in a predetermined percentage of the text segments, for example in at least 80% of the text segments and to classify any topics not meeting this requirement as subsidiary or lesser topics.

In an embodiment, the classifying means is arranged to weight a topic in accordance with the segment containing the topic so that, for example, topics occurring in the first and/or last segments of the document data are given a higher weighting.

In an embodiment, the classifying means is arranged to identify hierarchies of subsidiary topics by, for example, identifying a subsidiary topic as being a child or subsidiary topic of another topic (which may be a main or other subsidiary topic) when the text segment in which that subsidiary topic occurs represents a subset of the text segments in which the said other topic occurs.

This categorisation of topics enables a user of a text summary generated using this apparatus to determine easily and quickly the relative importance in document data of different topics in that document data.

In one aspect, the present invention provides apparatus for selecting sentences for use in a text summary, the apparatus comprising:

- topic weight assigning means for assigning weights to each topic in document data to be summarised:
- sentence weight assigning means for assigning a weight to each sentence in the document data;
- scoring means for scoring each sentence in the document data by summing the assigned weights;
- selecting means for selecting the sentence having the highest score;
- topic re-weighting means for re-weighting the topics to reduce the weight allocated to topics in the selected sentence; and control means for causing the scoring, selecting and re-weighting means to repeat the above operations until a certain number of sentences has been selected from the document data.

In an embodiment, the sentence weight assigning means is arranged to weight each sentence based on its position in the document data. In an embodiment, the sentence weight assigning means is arranged to assign a first weight to each sentence in the document data based on the position of that sentence in the document data (for example, a document title may be given a highest weight, paragraph headings a lower weighting, and so on), and to assign a second weight to each sentence in the document data based on the position of the paragraph containing that sentence in the document data (for example, the first and last paragraphs may have a higher weighting than other paragraphs in the document data).

In an embodiment, the control means is arranged to cause the scoring, selecting and re-weighting means to repeat their operations until either a fixed number of sentences have been selected or a fixed percentage of the number of sentences in the document data has been selected.

The use of the dynamic re-scoring of the sentences each time a sentence is selected should ensure that at least one sentence is selected for each topic identified in the document.

In one aspect, the present invention provides apparatus for providing a short form or capsule summary of document data, which apparatus comprises:
  receiving means for receiving data representing the topic or topics in the document data;
  locating means for locating, for words in the or each topic, words that co-occur with that word in the document data; and
  outputting means for outputting as a capsule summary text data in which each topic is associated with subsidiary items representing located co-occurring words.

In an embodiment, selection means are provided for selecting top ranking ones of the located co-occurring words.

In an embodiment, further locating means are provided for locating all words that co-occur with the subsidiary items and the output means is arranged to associate each such co-occurring word with the corresponding subsidiary item.

In an embodiment, filtering means are provided for filtering the co-occurring words to select those that have co-occurrences with the subsidiary items.

This enables short summaries to be provided for display on displays having a small area such as mobile telephones (cell phones) or personal digital assistants (PDAs).

In an embodiment, this apparatus enables a short summary to be provided that can complement a document title to avoid misleading information.

In one aspect, the present invention provides apparatus for modifying chunks of sentences selected for a document summary, which apparatus comprises:
  chunk identifying means for identifying chunks that do not contain words in a selected topic list; and
  chunk modifying means for modifying the identified chunks;
  display means for displaying the document summary with the modified chunks; and control means for causing a modified chunk to be displayed in its unmodified form when a user selects the modified chunk, for example by positioning a cursor over it.

In an embodiment, the chunk modifying means is arranged to modify a chunk by replacing it with an indicator such as ellipsis. In another embodiment, the chunk modifying means may eliminate the chunk.

In an embodiment, the control means is arranged to cause the unmodified form of a chunk to be displayed when a cursor is positioned over a modified chunk.

Embodiments of the present invention will now be described by way of example, with reference to the accompanying drawings, in which.

Figure 1:
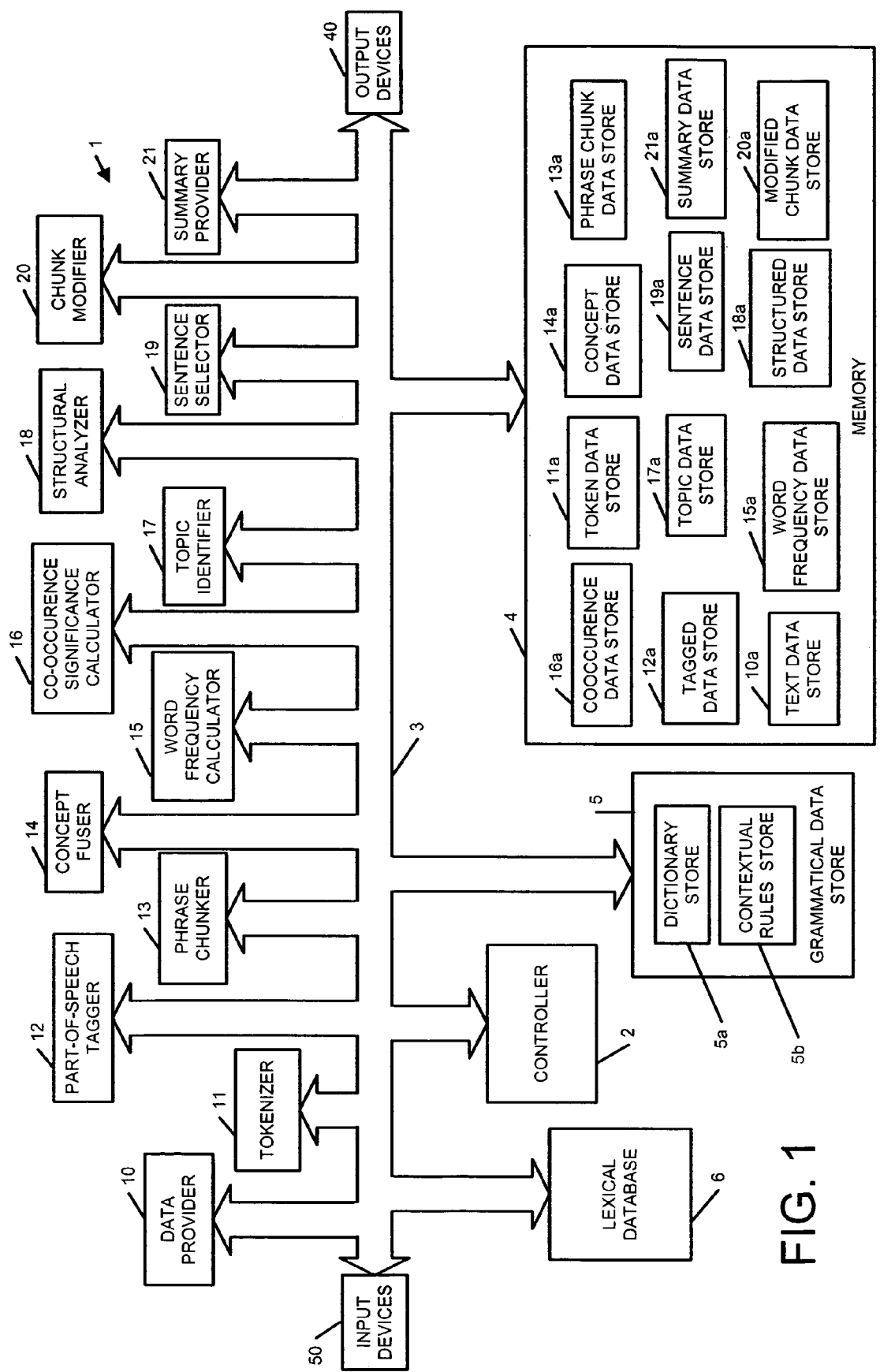
FIG. 1 shows a functional block diagram of text summarising apparatus embodying the present invention.
Figure 14A:
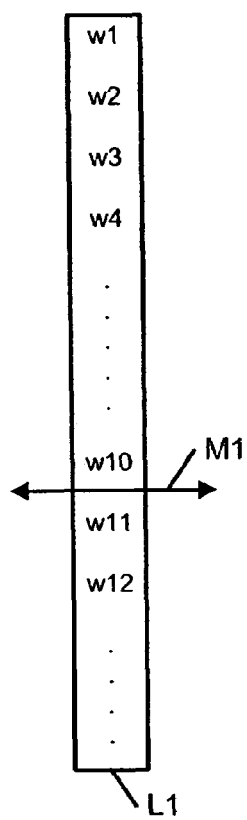
Figure 14B:
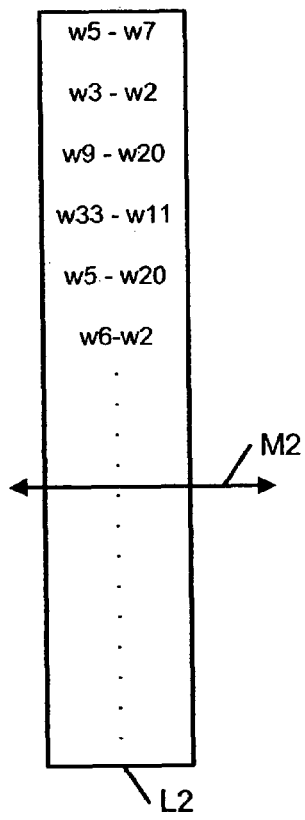
Figure 14C:
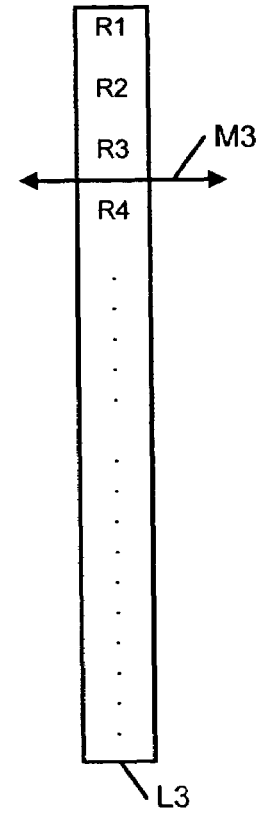
Figure 15:
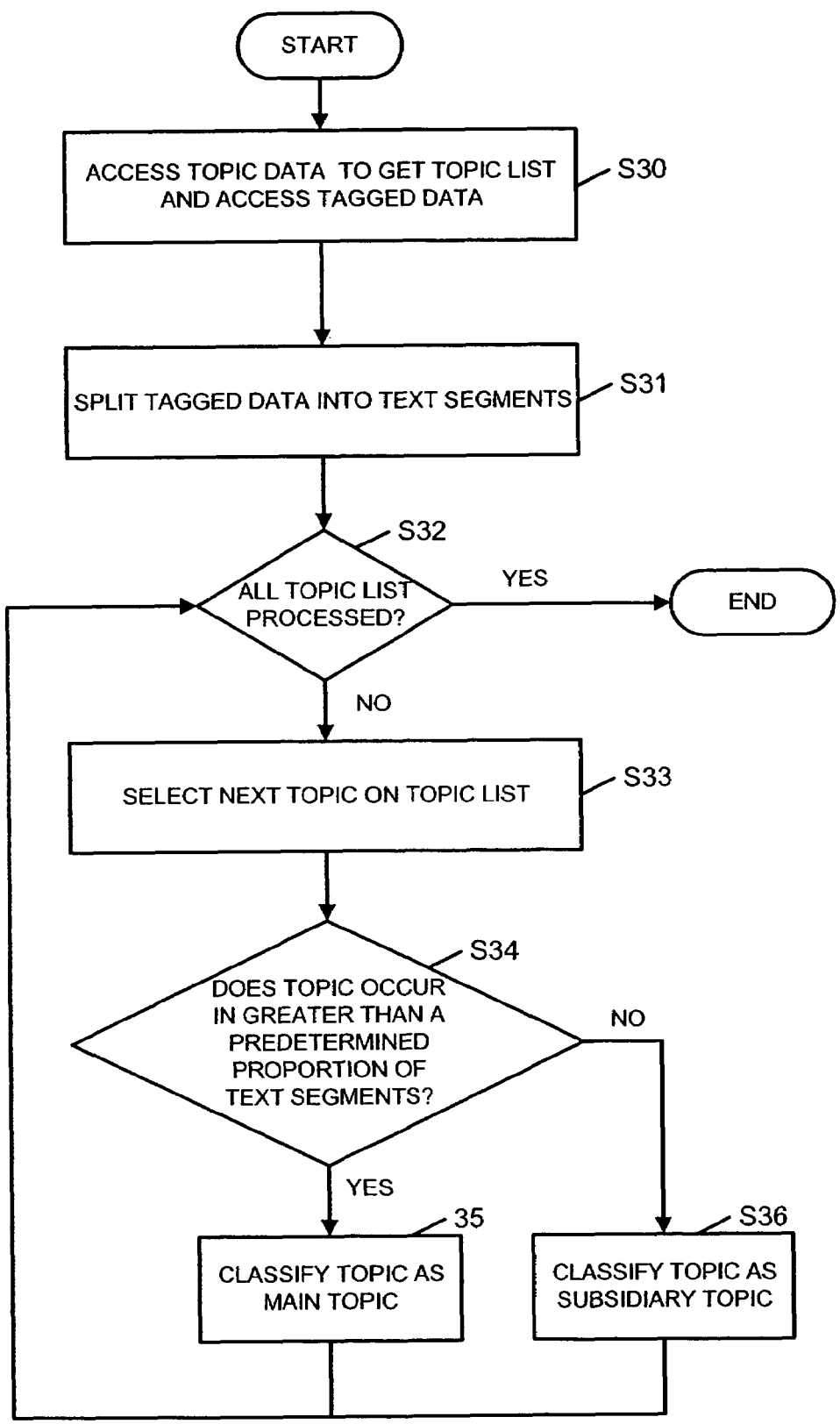
Figure 16:
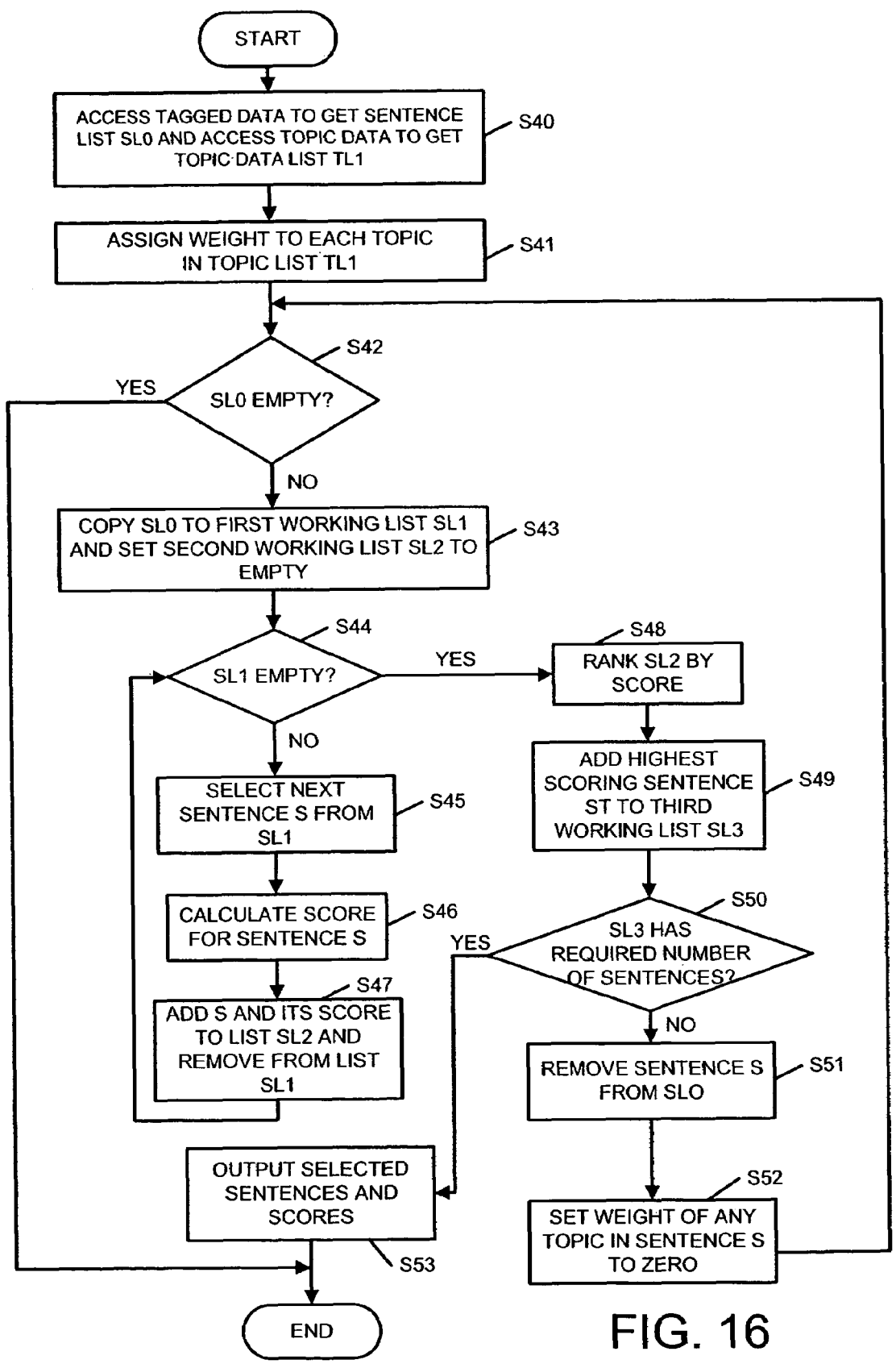
Figure 17:
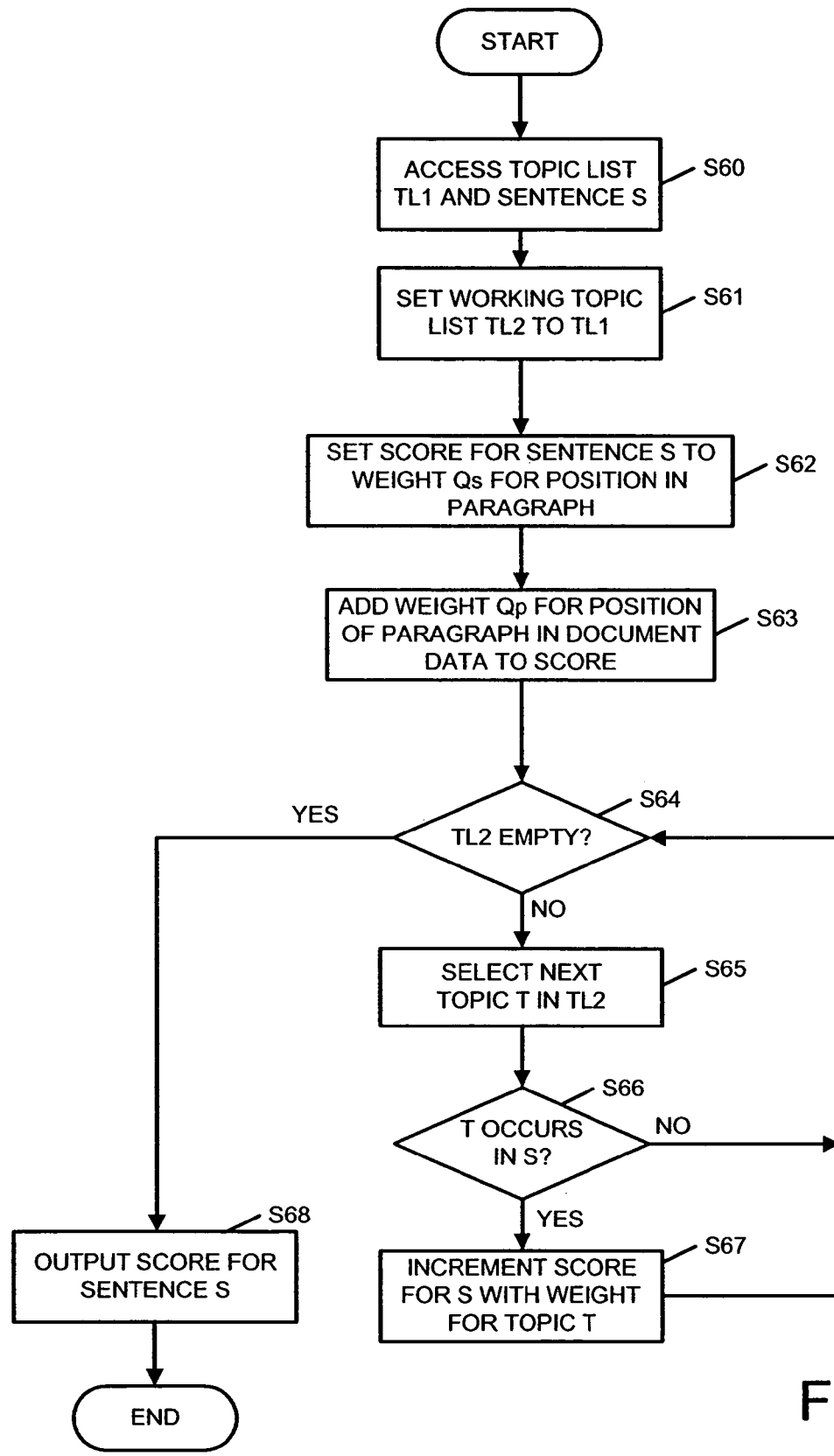
Figure 18:
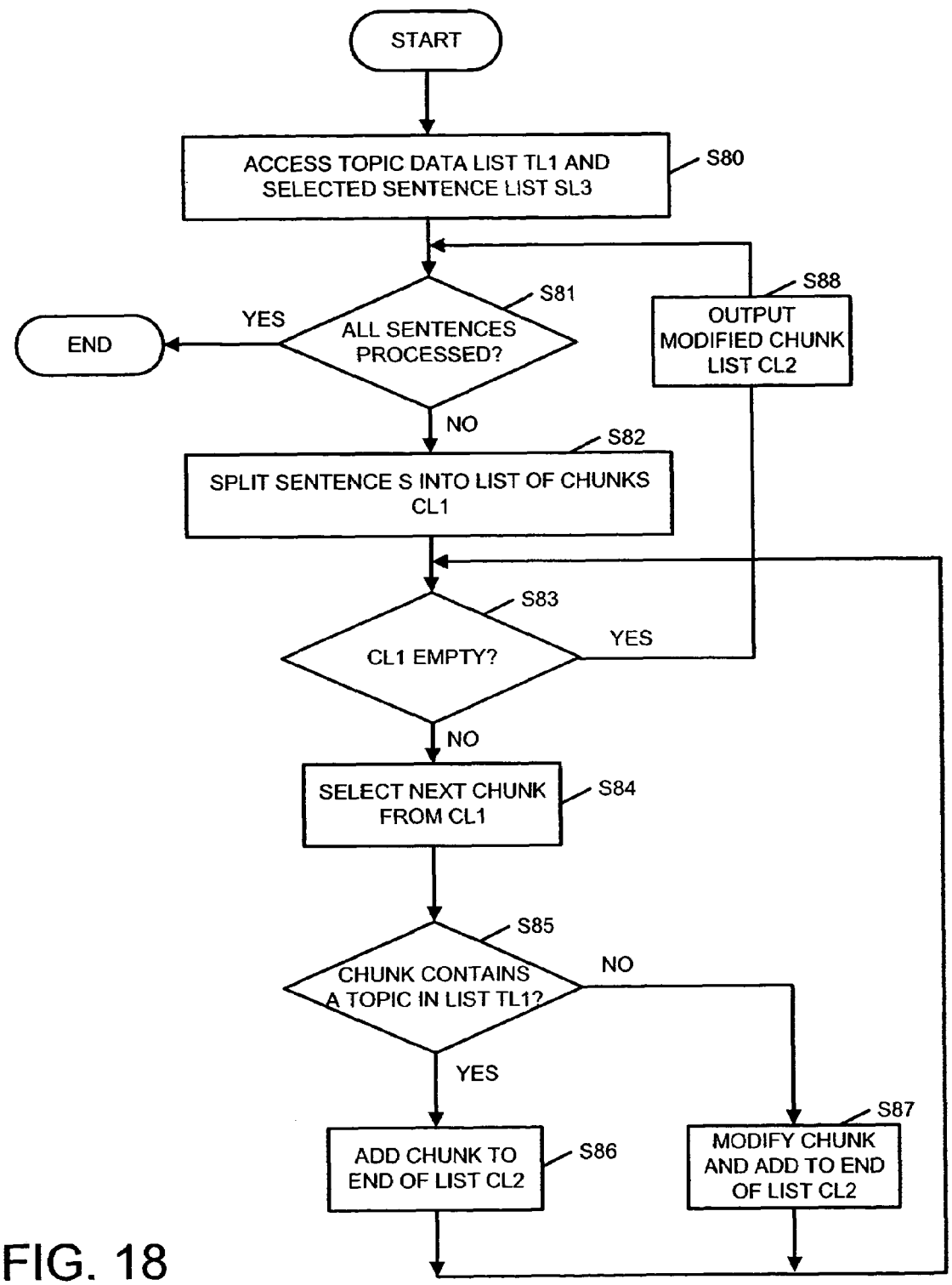
Figure 19:
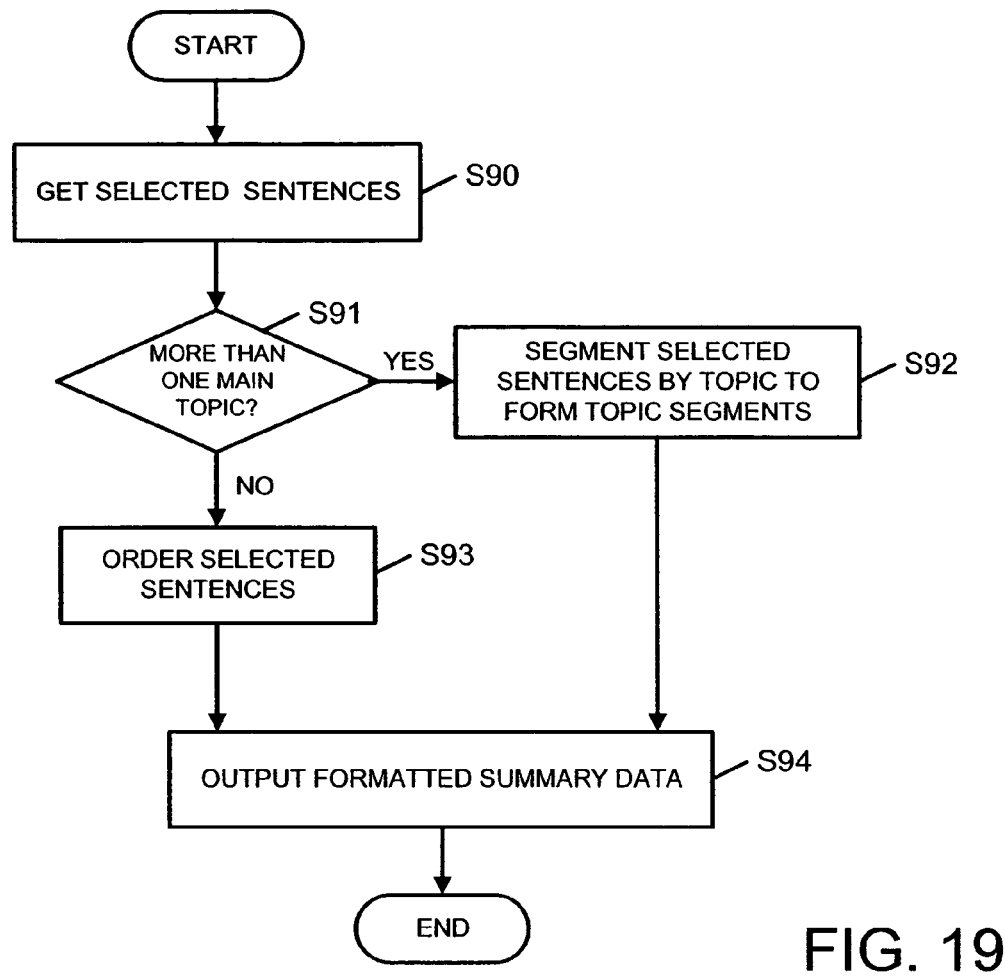
Figure 20:
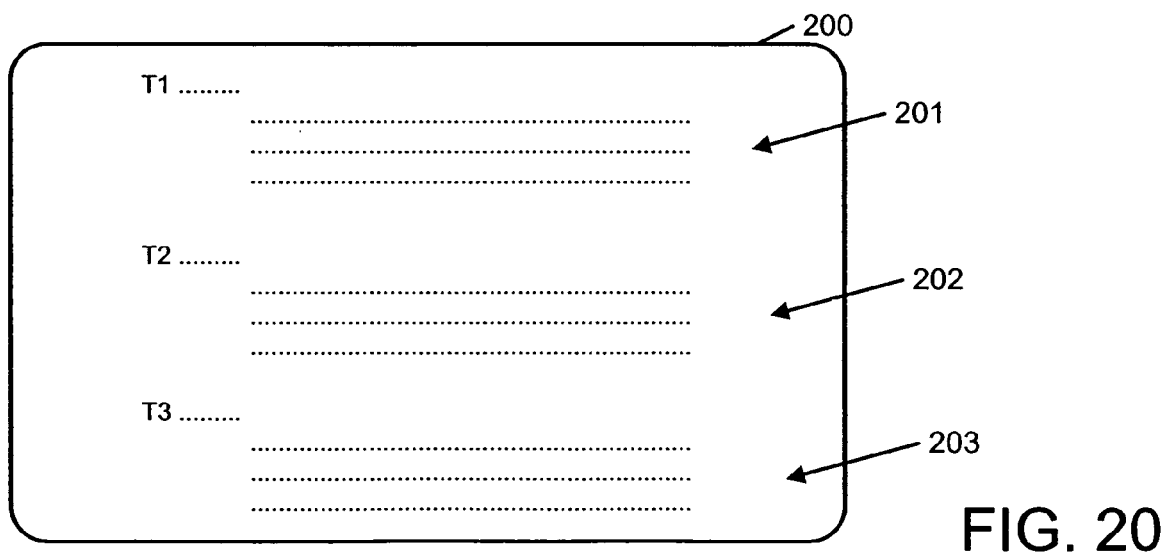
Figure 21:
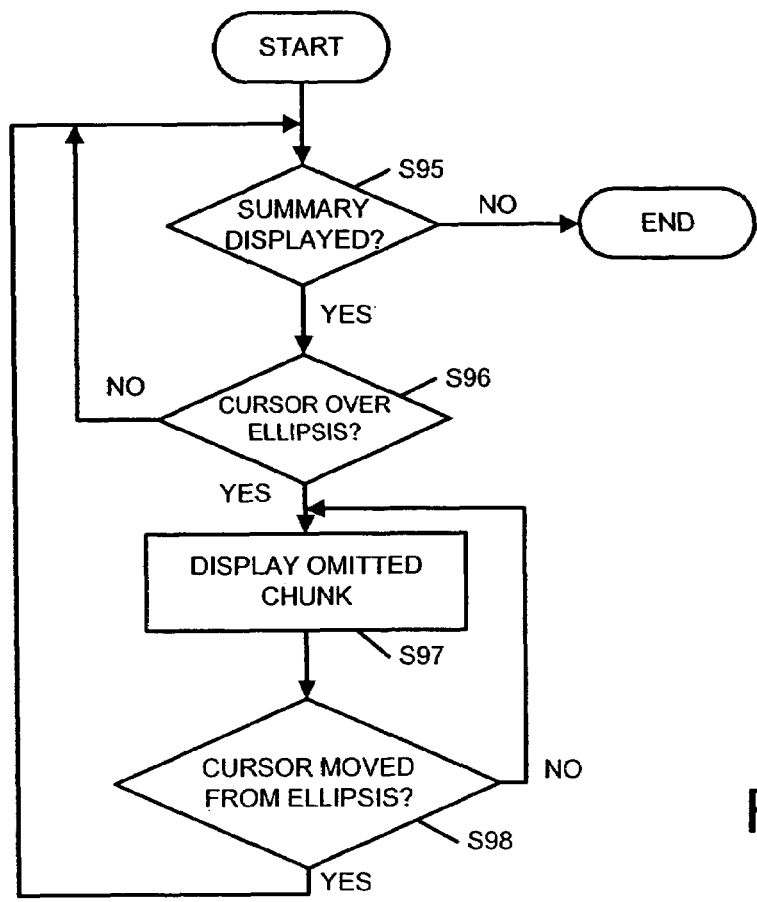

FIGS. 14a, 14b, and 14c show, respectively representations of a ranked words table, a ranked co-occurrences table and a ranked phrases table stored in a data storage of the text summarising apparatus shown in FIG. 1;

FIG. 15 shows a flow chart for illustrating operation of the structural analyser;

FIG. 16 shows a flow chart for illustrating operation of the sentence selector;

FIG. 17 shows a flow chart for illustrating in greater detail a score calculating operation shown in FIG. 16;

FIG. 18 shows a flow chart for illustrating operation of the chunk modifier;

FIG. 19 shows a flow chart for illustrating one example of a operation of the summary provider;

FIG. 20 shows a display screen for illustrating one display format for a text summary;

FIG. 21 shows a flow chart for illustrating operation of the summary provider in response to positioning of a display cursor by a user.

Figure 22:
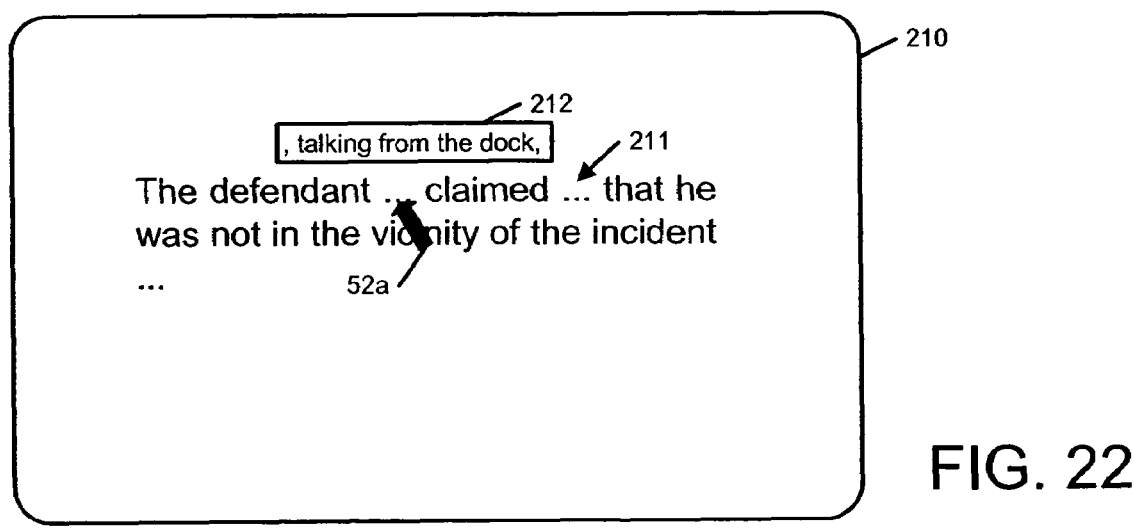
Figure 23:
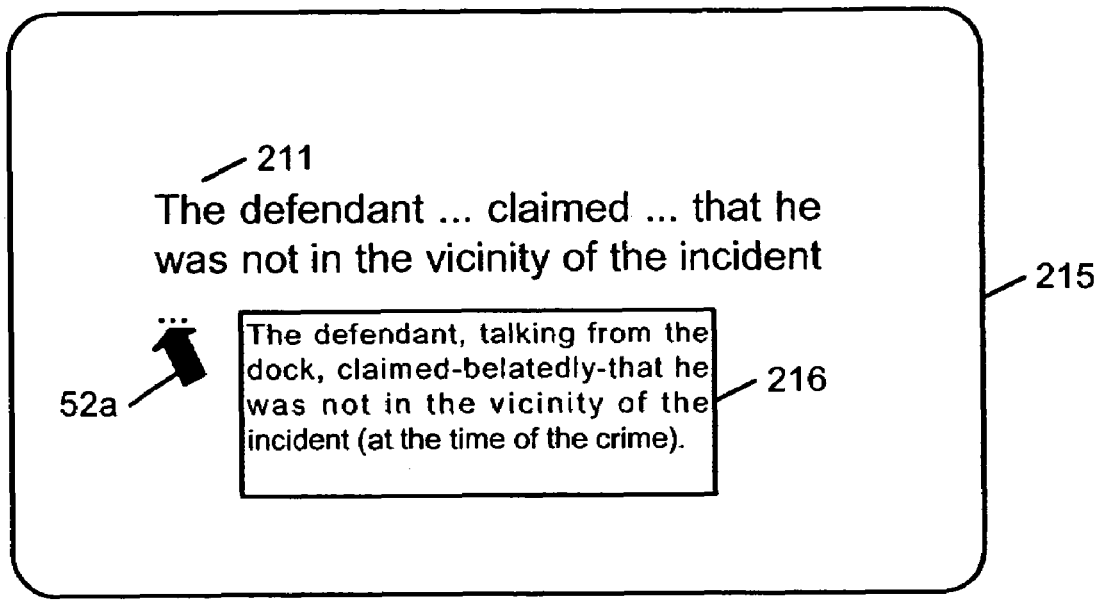
Figure 26:
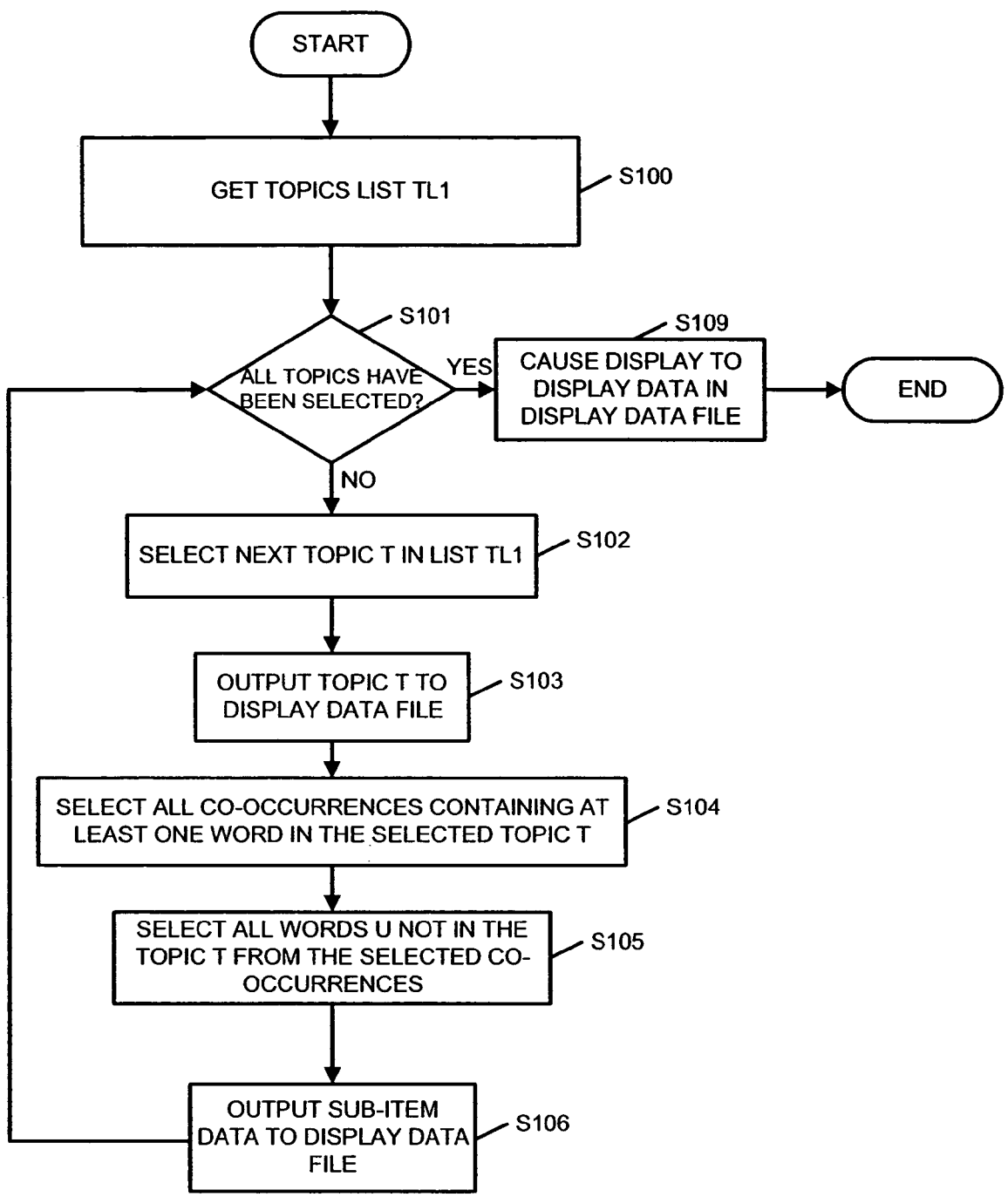
Figure 27:
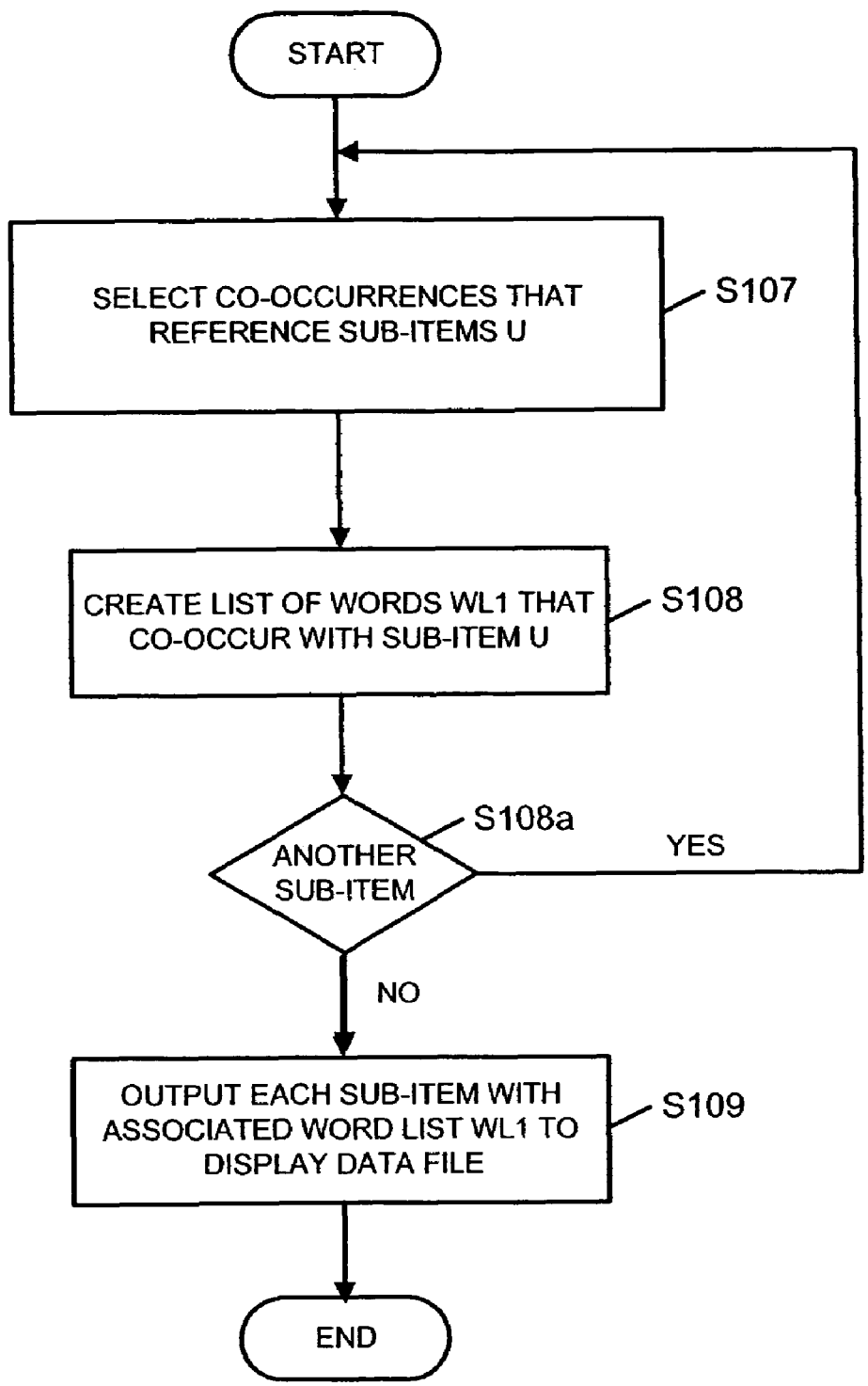
Figure 28:
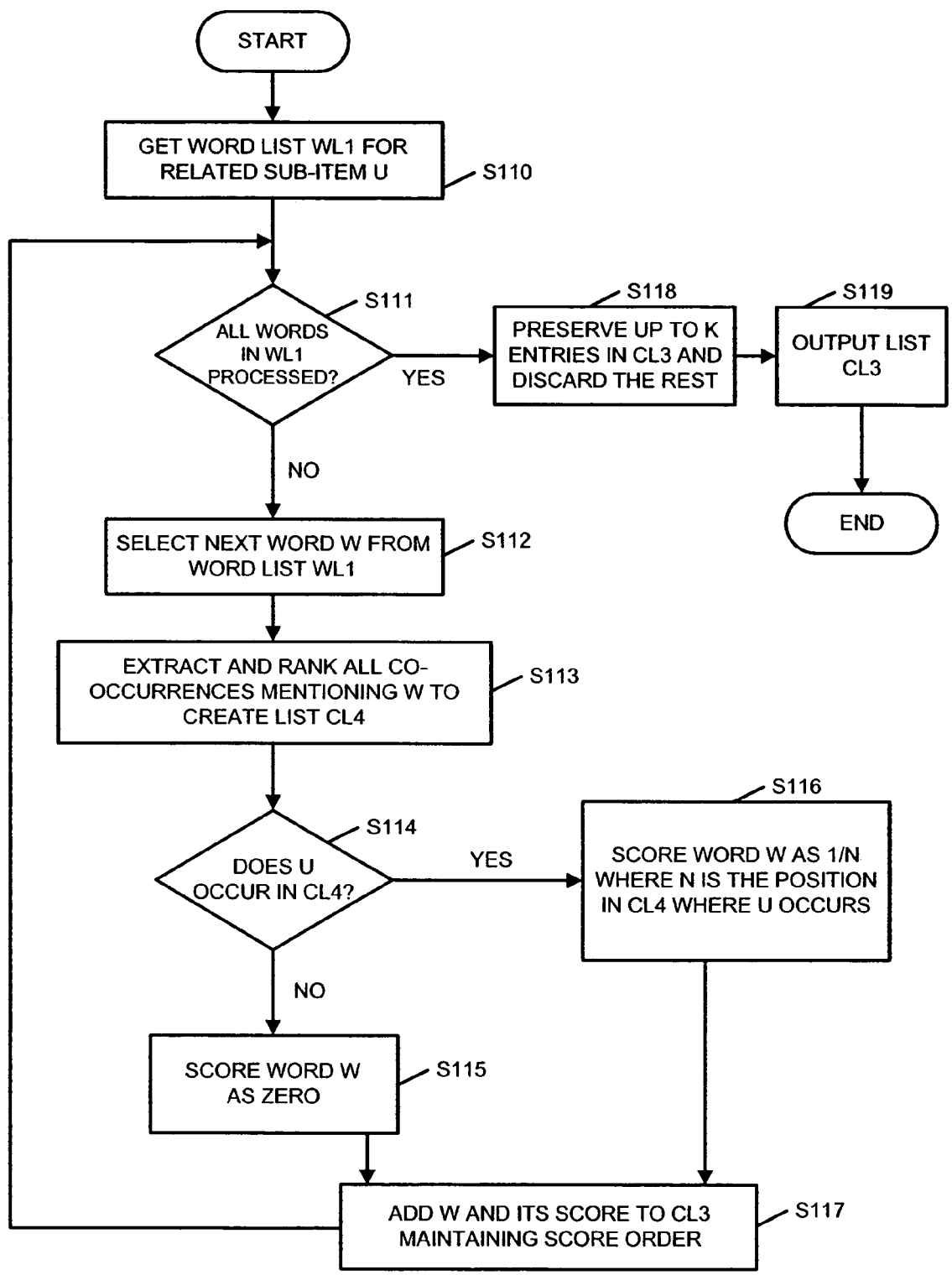
Figure 29:
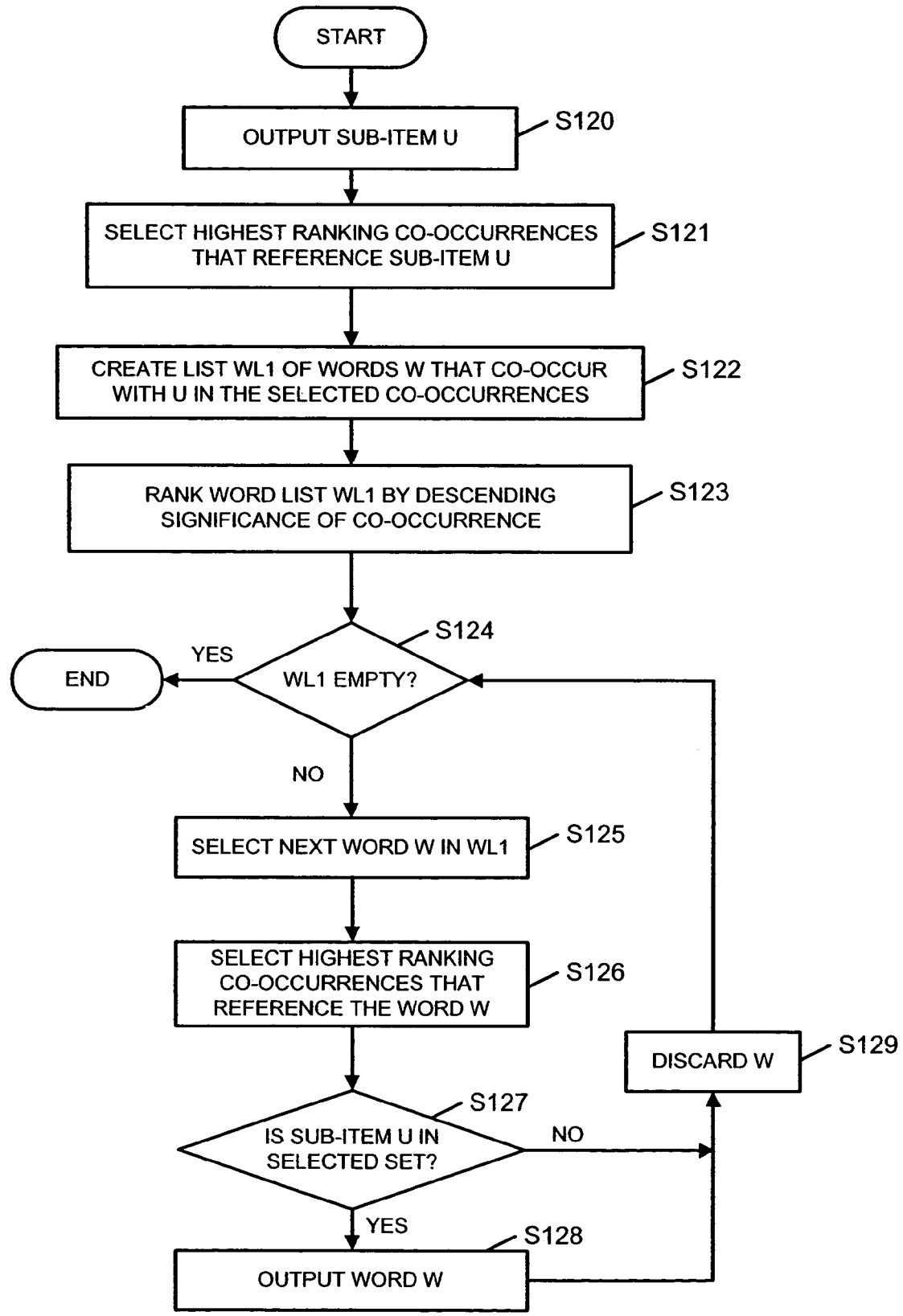
Figure 30:
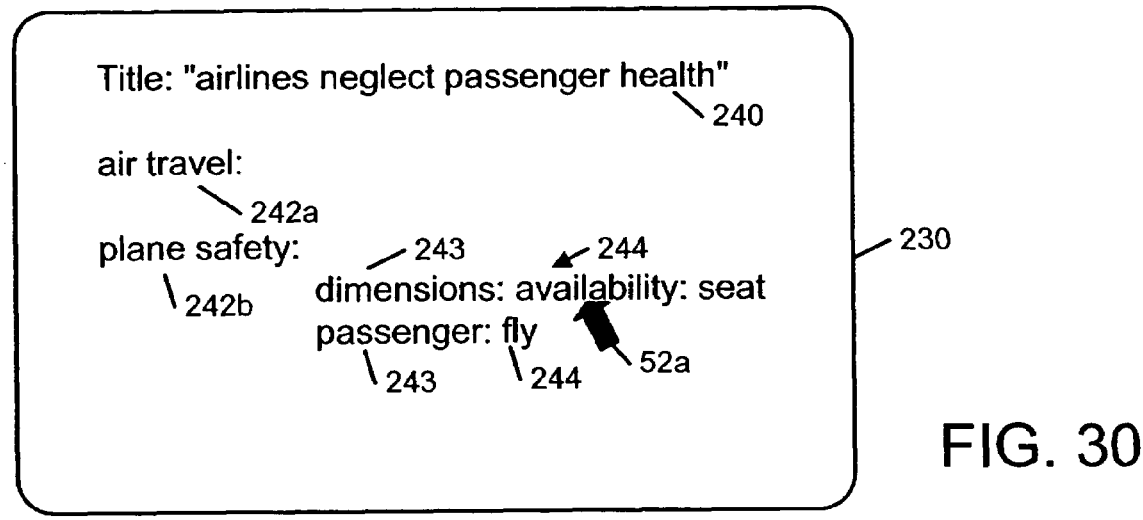
Figure 31:
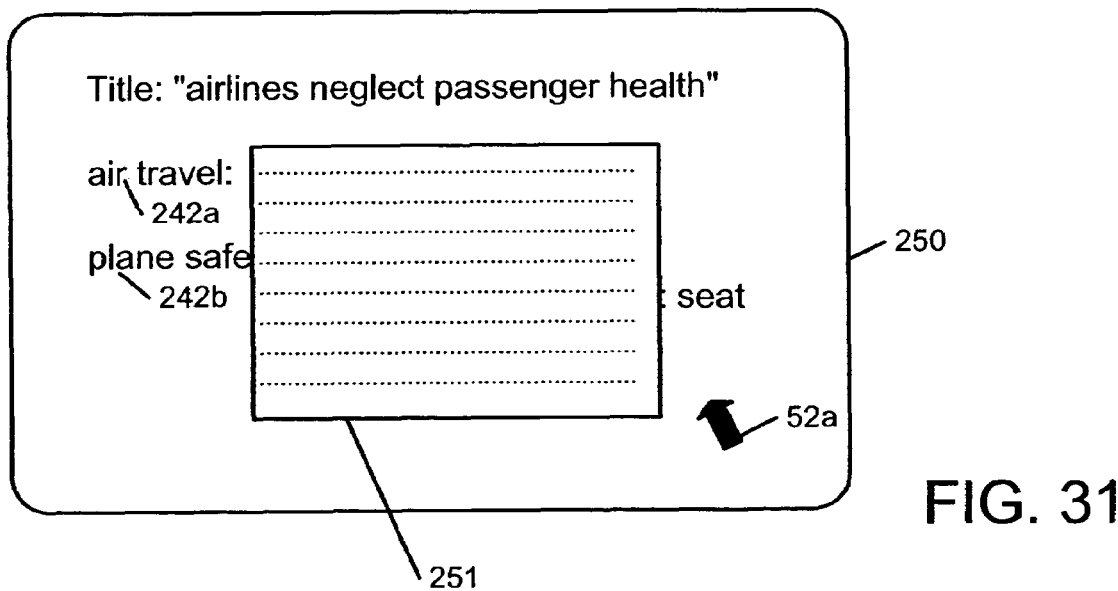
Figure 32:
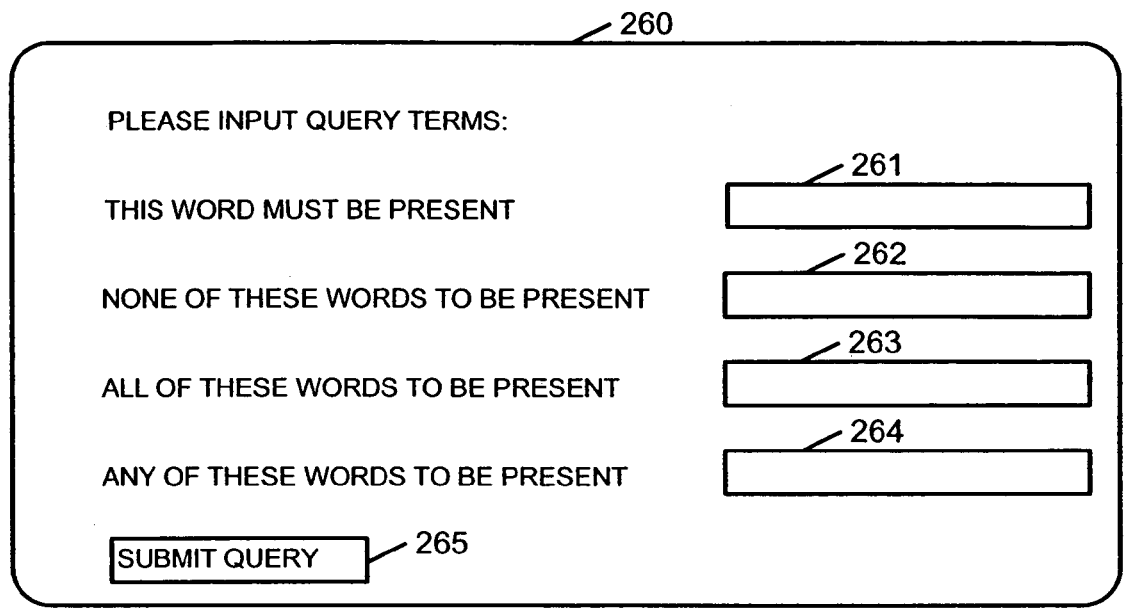

FIG. 22 shows a display screen for illustrating one way in which the summary provider may modify a displayed summary in response to a position of a display cursor;

FIG. 23 shows a display screen to illustrate another way in which the summary provider may modify a displayed summary;

FIGS. 24 and 25a to 25c show display screens for illustrating various different ways in which the summary provider may cause to display a summary;

FIG. 26 shows a flow chart for illustrating operation of the summary provider to provide a short form or capsule summary;

FIG. 27 shows a flow chart for illustrating in greater detail an operation providing co-occurrence data;

FIGS. 28 and 29 show flow charts for illustrating in greater detail another way of providing co-occurrence data;

FIGS. 30 and 31 show display screens for illustrating different ways of displaying a capsule summary;

FIG. 32 shows a display screen for enabling input of query/search terms; and

Figure 33:
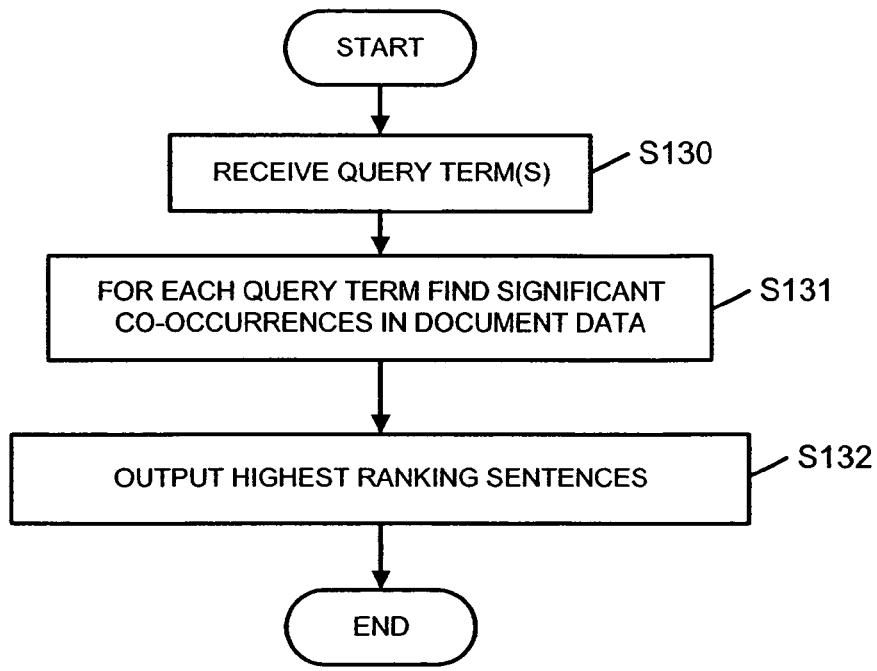

FIG. 33 shows a flow chart for illustrating operation of the apparatus shown in FIG. 1 to provide a query based summary.

Referring now to the drawings, FIG. 1 shows a functional block diagram of text summarising apparatus 1.

The text summarising apparatus comprises a data provider 10 for providing document data to be summarised, a tokeniser 11 for separating document data provided by the data provider 10 into tokens, that is individual words and punctuation, a part-of-speech (POS) tagger 12 for tagging the tokenised text data with data representing the grammatical category of the tokens such as, for example, noun, verb or adjective, and a phrase chunker 13 for identifying phrasal chunks in the part-of-speech tagged text data.

The text summarising apparatus also has a word frequency calculator 15 for counting the number of times that a word occurs in the text data to be summarised, a co-occurrence significance calculator 16 for identifying relationships or co-occurrences between words in the text data being summarised, a topic identifier 17 for identifying topics in the text data, a structural analyser 18 for identifying main and subsidiary topics in the text data, a sentence selector 19 for selecting sentences to be included in the summary, a chunk modifier 24 for modifying chunks of the selected sentence in accordance with their relevance to the summary and a summary provider 20 for outputting the summary for use by a user.

The text summarising apparatus 1 has a controller 2 for controlling overall operation of the apparatus and a data storage 4 for storing data received and produced by the text synthesising apparatus. In this example, the data storage 4 has a store for each of the functional components of the text summarising apparatus, that is the data storage 4 has a text data store 11a and token data store 11a, a tagged data store 12a, a phrase chunk data store 13a, a word frequency data store 15a, a co-occurrence significance data store 16a, a topic data store 17a, a structured data store 18a, a sentence data store 19a a modified chunk data store 20a and a summary data store 21a.

The text summarising apparatus 1 may also have a concept fuser 14 (having an associated concept data store 14a in the data storage 4) for identifying words that can be grouped together semantically and therefore treated as identical in meaning. Where the concept fuser 14 is provided, then the text summarising apparatus 1 has access to a lexical database 6 such as the "WordNet" lexical database of the English language supplied by the Cognitive Science Laboratory of Princeton University, 221 Nassau Street, Princeton, United States of America, available on line via http://www.cogsci.princeton.edu/~wn/.

The text summarising apparatus also has access to a grammatical data store 5 have a dictionary store 5a which stores data associating words with their grammatical categories (nouns, verbs, adjectives and so on) and a contextual rule store 5b for use by the part-of-speech tagger 12 to enable identification of the various part-of-speech in text data provided by the data provider 10.

As shown in FIG. 1, the communication between the functional components of the text synthesising apparatus is effected by means of a bus 3 that enables the communication between each of the functional modules 10 to 21, the controller 2, and the data storage 4.

As shown in FIG. 1, the lexical database 6 and grammatical data store 5 also communicate with the remaining components of the text summarising apparatus via the bus 3. It will, however, be appreciated that the lexical database and grammatical data store 5 may be remotely located and may communicate with the remaining components of the text summarising apparatus via a remote link, for example over a network such as a local area network, a wide area network, the Internet or an intranet.

Figure 2:
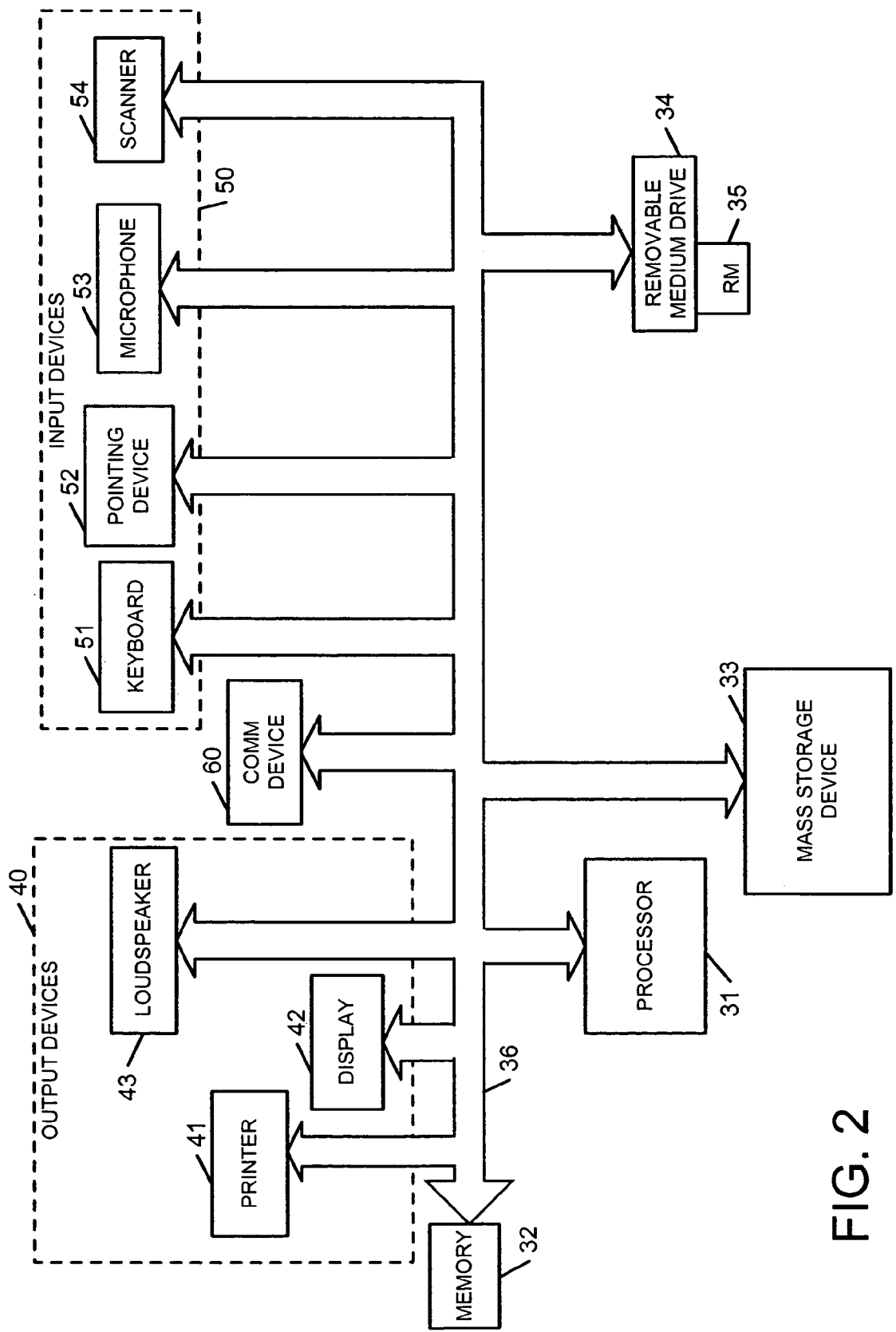
FIG. 2 shows a functional block diagram of computing apparatus that can be programmed to provide the text summarising the apparatus shown in FIG. 1.

FIG. 2 shows a functional block diagram of computing apparatus 30 that may be programmed to provide the text summarising apparatus 1 shown in FIG. 1.

The computing apparatus 30 comprises a processor 31 with data storage in the form of a memory 32 (ROM and/or RAM), a mass storage device 33 such as a hard disk drive, and a removable medium storage device 34 for receiving a removable medium 35, for example a floppy disk drive, a CDROM, DVD or CDRW drive.

The processor 31 also has a number of peripheral input and output devices. As shown, the computing apparatus 1 has output devices 40 in the form of a printer 41 and a display 42 and, optionally, also a loudspeaker 43 and input devices 50 in the form of a keyboard 51, a pointing device 52 such as a mouse and, optionally, a microphone 53 and a scanner 54. The computing apparatus is also associated with a further peripheral device in the form of a communications device (COMM DEVICE) 60 which provides both an input and an output device. The communications device 60 may be a MODEM for communicating with the Internet or other remote communications apparatus or a network card.

Communication between the various functional components of the computing apparatus 1 is effected by means by a bus 36.

The computing apparatus 30 may be programmed to provide the text summarising apparatus 1 by any one or more of the following:

1. program instructions downloaded from an removable medium 35 received in the removable medium storage device 34,
2. program instructions pre-stored in the mass storage device 33,
3. program instructions pre-stored in a non-volatile (for example ROM) portion of the memory 32;
4. program instructions supplied via the communications device 60; and
5. program instruction input by the user using an input device 50.

The overall operation of the text summarising apparatus will now be described with the aid of FIG. 3 which is a functional diagram for illustrating the sequence in which the various functional modules operate.

Figure 3:
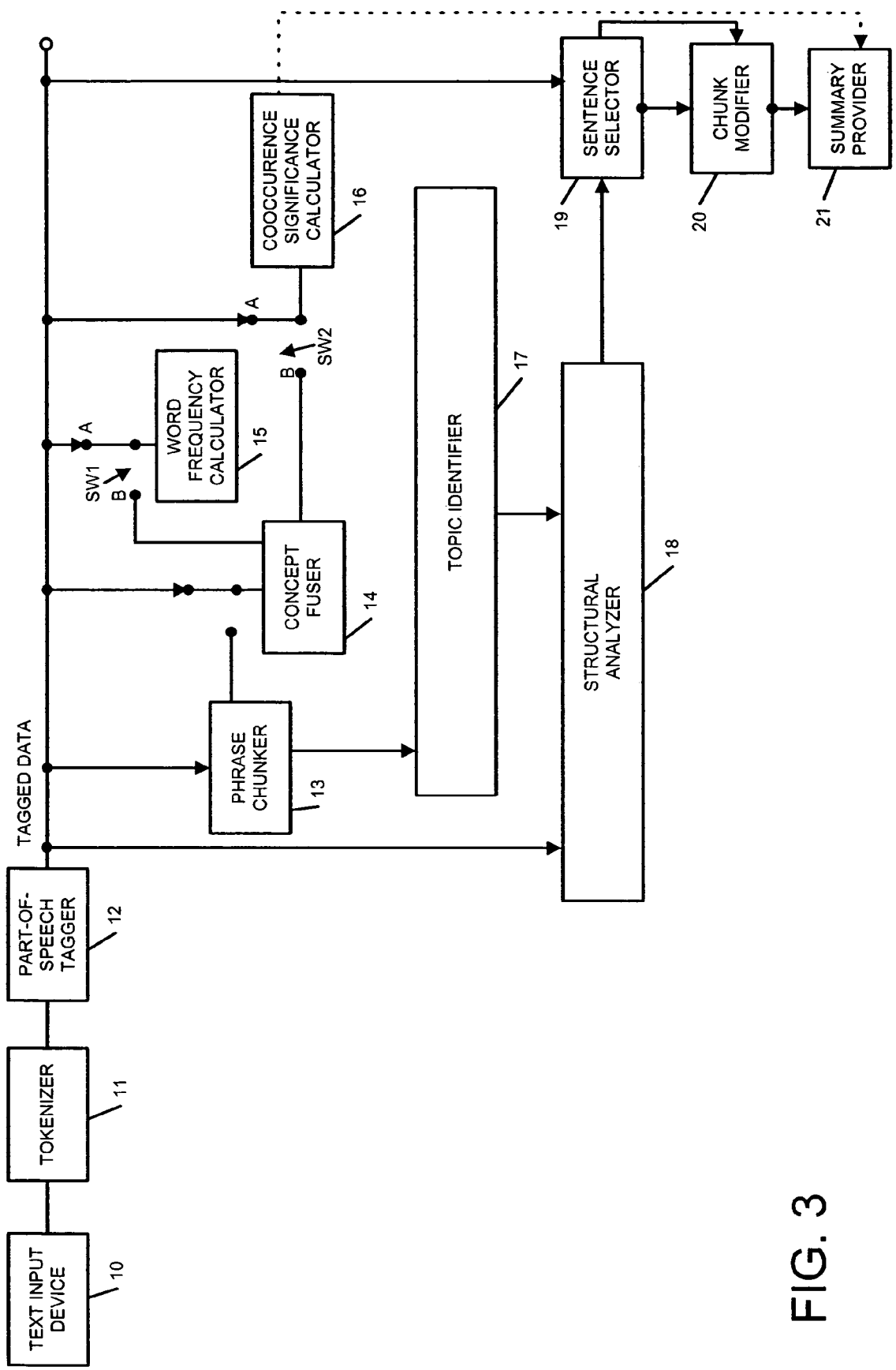
FIG. 3 shows a data flow diagram for illustrating the flow of data between modules of the text summarising apparatus shown in FIG. 1.

As shown in FIG. 3, text data provided by the text data provider 10 and stored in the text data store 10a is used by the tokeniser 11 to produce tokenised data which is stored in the token data store 11a for use by the part-of-speech tagger 12 which provides part-of-speech tagged data which is then stored in the tagged data store 12.

The tagged data store 12 is accessed by the phrase chunker 13, word frequency calculator 15, co-occurrence calculator 16, sentence selector 19 and structural analyser 18. Phrase chunk data provided by the phrase chunker 13 is stored in the phrase chunk data store 13a for access by the topic identifier 17.

The topic identifier 17 also accesses word frequency data stored in the word frequency data store 15 by the word frequency calculator and co-occurrence data stored in the co-occurrence data store 16a by the co-occurrence calculator. Topic data provided by the topic data identifier 17 and stored in the topic data store 17a is accessed by the structural analyser 18 which stores structured data in the structured data store 18a for access by the sentence selector 19 and the chunk modifier 20.

The sentence selector 19 uses the part-of-speech tagged data and the structured data to provide sentence selection data which is stored in the sentence data store 19a for access by the chunk modifier 20.

The chunk modifier 20 accesses the structured data in the structured data store 18 and the sentence data in the sentence data store 19a and provides modified chunk data which is stored in the modified chunk data store 20a for access by the summary provider 21 which may, as shown by the dashed line in FIG. 3, also access the co-occurrence data stored in the co-occurrence data store 16a.

Where the concept fuser is provided then, as illustrated by switches SW1 and SW2, the word frequency calculator and the co-occurrence calculator 16 may be arranged to access either the part-of-speech tagged data (illustrated by position A of switches SW1 and SW2) or the concept data produced by the concept fuser 14 (as illustrated by position B of the switches SW1 and SW2).

Figure 4:
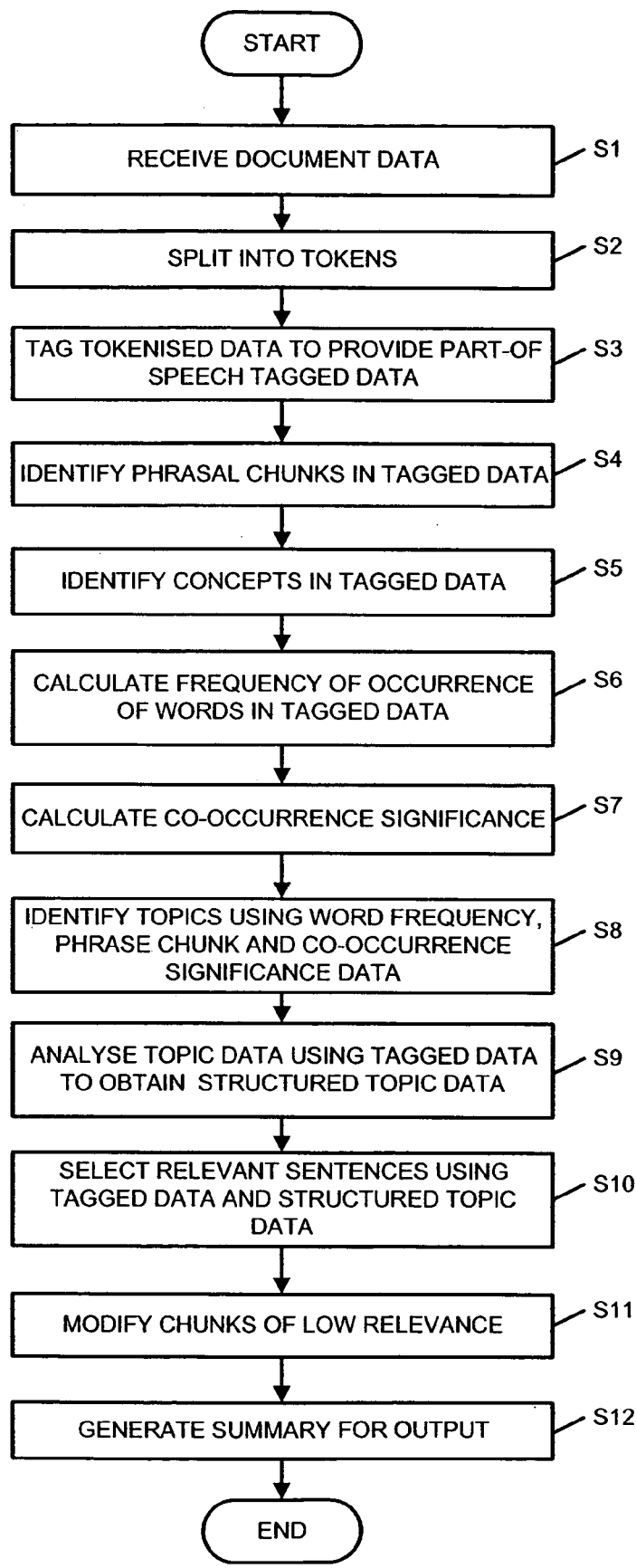
FIG. 4 shows a flowchart for illustrating operation of the text summarising apparatus shown in FIG. 1.

FIG. 4 shows a flow chart illustrating the operations carried out by the text summarising apparatus.

Thus illustrated by the flowchart shown in FIG. 1 at S1 the data provider 10 receives text data. At S2 the tokeniser 11 splits the received text data into tokens and at S3 the part-of-speech tagger 12 tags the tokenised data to provide part-of-speech (POS) tagged data, using the data stored in the dictionary store 5a and contextual rules store 5b.

At S4, the phrase chunker 13 identifies phrasal chunks in the part-of-speech tagged data and if the concept fuser 14 is provided, at S5, the concept fuser 14 identifies concepts in the part-of-speech tagged data using the lexical database 6.

At S6 the word frequency calculator 15 calculates the frequency of occurrence of words in the part-of-speech tagged data (optionally omitting common words such as definite and indefinite articles, conjunctions and propositions) and at S7 the co-occurrence significance calculator 16 determines co-occurring words in the part-of-speech tagged data and calculates a significance measure for each co-occurrence.

Then, at S8, the topic identifier 17 identifies topics in the text data using the word frequency, phrase chunk and co-occurrence significance data and at S9, the structural analyser 18 analyses the part-of-speech tagged data using the topic data to obtain topic structured data. Then at S10 the sentence selector 19 selects relevant sentences for the summary using the part-of-speech tagged data and the topic structured data. Optionally, then at S11 the chunk modifier 20 modifies or eliminates chunks of low relevance from the selected sentences. At S12 the summary provider 21 generates a summary for output to a user on the basis of the selective sentences including any modification by the chunk modifier 20.

The functional structure of the co-occurrence significance calculator 16, topic identifier 17, structural analyser 18, sentence selector 19, chunk modifier 20 and summary provider 21 will now be described in greater detail with the help of FIGS. 4 to 11 after which the operation of the text summarising apparatus will be described in greater detail with the help of FIGS. 12 to 33.

Figure 5:
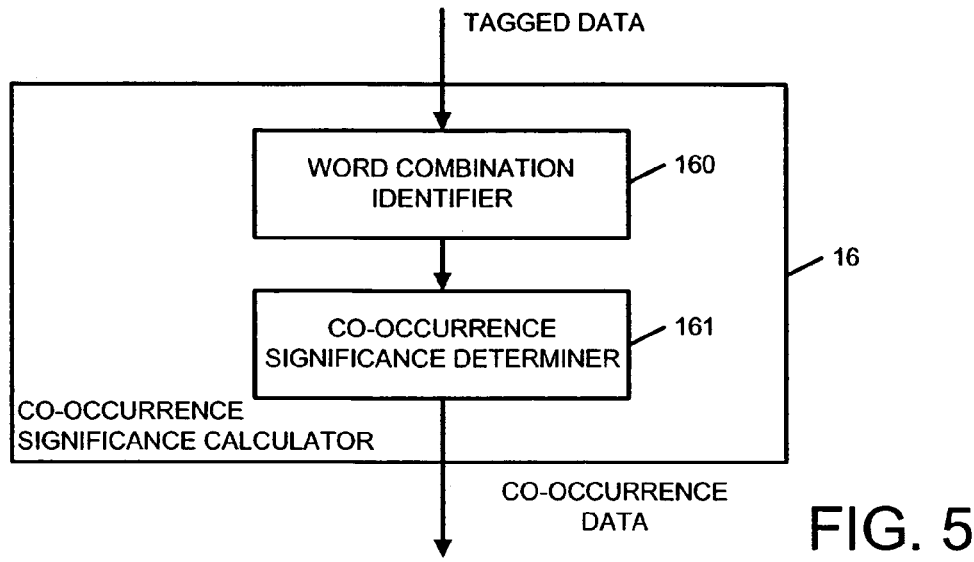
FIG. 5 shows a functional block diagram of a co-occurrence significance calculator of the text summarising apparatus shown in FIG. 1.

As shown in FIG. 5, the co-occurrence significance calculator 16 comprises a word combination identifier 160 arranged to identify for each successive portion of the POS tagged data, co-occurrences consisting of combinations of words in certain grammatical categories, in this case:

noun and verb
noun and noun
noun and proper noun
verb and proper noun
proper noun and proper noun ignoring the order in which the words occur.

In this example, the text portion used by the word combination identifier 160 is the sentence so that pairs of words in the above categories are said to co-occur if they arise in the same sentence. The text portions could, however, be defined by the word combination identifier 160 as other text portions such as paragraphs, text delimited by punctuation marks (such as commas, parenthesis or hyphens) or as phrases (in which case the co-occurrence calculator 16 will also access the output of the phrase chunker 13).

Where the concept fuser 14 is provided then the co-occurrence calculator 16 may, as indicated by the position B of the switch SW2 in FIG. 3, be arranged to identify co-occurrences in the concept data provided by the concept fuser 14 rather than in the part-of-speech tagged data.

The word combination identifier 160 is thus arranged to restrict the co-occurrences to words in the grammatical categories that are most strongly related to the type of information that users are normally interested in, that is information such as what, when, how, why, where, etc.

The co-occurrence significance calculator 16 also includes a co-occurrence significance determiner 161 which is arranged to calculate the significance of co-occurrence word pairs using a standard significance measure and to output co-occurrence data.

Various significance measures are discussed in the paper by T. Dunning entitled "Accurate Methods for the Statistics of Surprise and Coincidence" published in computational linguistics 19(1), 1993 and accessible at http://citeseer.n-j.nec.com/dunning93accurate/html.

In this example, the co-occurrence significance determiner 161 uses the Likelihood Ratio which is considered to be more effective than other significance measures such as mutual information.

Figure 6:
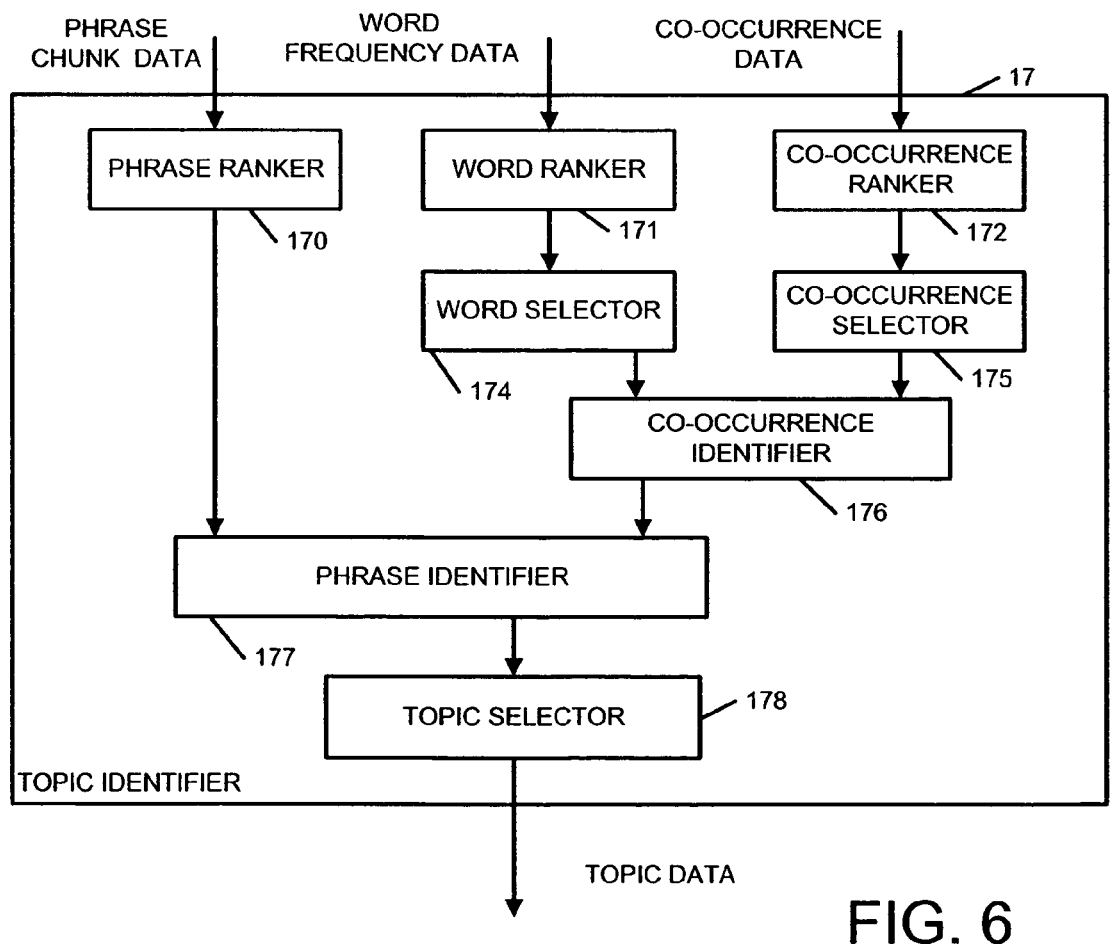
FIG. 6 shows a functional block diagram of a topic identifier of the text summarising apparatus shown in FIG. 1.

FIG. 6 shows a functional block diagram of the topic identifier 17.

In this example, the topic identifier 17 has a phrase ranker 170 arranged to access phrase chunk data provided by the phrase chunker 13 and to rank the phrases by descending frequency of occurrence. The topic identifier also has a word ranker 171 arranged to access word frequency data provided by the word frequency calculator 15 and to rank the word frequency data by descending frequency of occurrence and a co-occurrence ranker 172 arrange to access the co-occurrence data produced by the co-occurrence significance calculator 16 and to rank the co-occurrences by descending significance.

The topic identifier is arranged to store this data in ranked word, co-occurrence and phrase data tables L1 to L3 in a ranked data storage portion of the topic data store 17a. FIGS. 14a, 14b and 14c show very diagrammatically examples of a ranked words frequency table L1, a ranked co-occurrence table L2 and a ranked phrases table L3.

The topic identifier 17 also has a word selector for selecting the highest ranking words according to a predefined measure. In this example, the x highest ranking words are chosen with x being, in this example 10. As an alternative the words selector 174 may be arranged to select a predefined percentage of the ranked words based on, for example, the number of words in the ranked list or the length of the document data being summarised.

A co-occurrence selector 175 is provided to select the highest ranking co-occurrences according to a predefined measure. In this case, the y highest ranking co-occurrences are selected where y is, in this example 5. As another possibility, the number of co-occurrences selected may be defined as a percentage of the number of co-occurrences in the rank co-occurrence list or based on the length of the document data.

A co-occurrence identifier 176 is provided to identify the selected co-occurrences which contain at least one of the selected words and a phrase identifier 177 is provided to identify which of the ranked phrases contain at least one word from the co-occurrences identified by the co-occurrence identifier 176.

A topic selector 178 is provided to identify the highest ranking phrases amongst the phrases identified by the phrase identifier 177 according to a predefined measure. In this example, the topic selector 178 is arranged to select as the topics of the document data the z highest ranking identifier phrases where z is, in this example, either 2 or 3. Again, as an alternative, the topic selector 178 may be ranged to select a predefined percentage of the phrases in the ranked phrase list.

Figure 7:
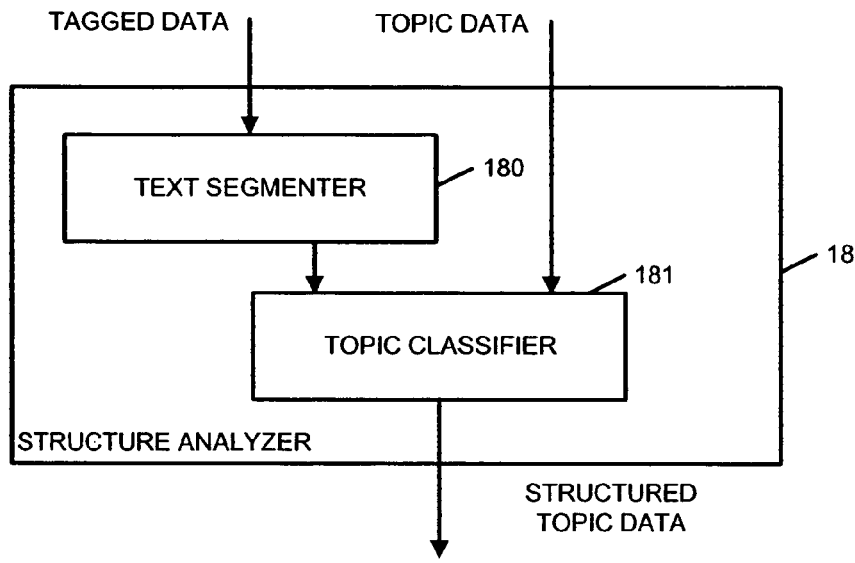
FIG. 7 shows a functional block diagram of a structural analyser of the text summarising apparatus shown in FIG. 1.

FIG. 7 shows a functional block diagram of the structural analyser 18 which, in this example, consists of a text segmenter 180 that is arranged to split or separate the part-of-speech tagged data into text segments using a standard tiling algorithm as described in the paper entitled "multi-paragraph segmentation of expository text" by Marti A. Hearst given at the 32nd Annual Meeting of the Association for Computational Linguistics in 1994 and available at http://citeseer.nj.nec.com/hearst94multiparagraph.html.

The segmented text data is provided to a topic classifier 181 arranged to access the topic data provided by the topic identifier to classify the topics identified by the topic identifier according to the distribution of the topics in the text segments so that a topic is classified as a main topic if it occurs in a predefined percentage of the text segments of the document (in this example if the topic occurs in at least 80% of the text segments) and is classified as a subsidiary or less important topic if it does not meet this criteria.

The topic classifier 181 may be arranged to provide a greater weight to topics occurring in specific segments of the text so that the topics occurring in those segments are more likely to be defined as main topics then topics that do not occur in those segments. As an the example, the topic classifier 181 may be arranged to give additional weight to topics which occur in the first and/or the last text segments of data representing a single document on the grounds that the first text segment will usually constitute an abstract or introductory paragraph which should discuss the main topic of the document and the last paragraph will usually constitute a summary of the document and again should be primarily concerned with the main topic addressed by the document.

As an alternative to using the text tiling approach described in the paper by Hearst, the text segmenter 1818 may simply split the document data up into the paragraphs defined in the position speech tagged data.

The topic classifier 181 may also be arranged to enable hierarchies of topics to be defined. Thus, the topic classifier 181 may be arranged to define a particular subsidiary topic as being a child of a parent topic if the set of text segments in which that subsidiary topic occurs is a subset of the set of segments in which the parent topic occurs. A technique for doing this is described in a paper entitled "Finding Topic Words for Hierarchical Summarization" by Dawn Laurie, W. Bruce Croft and Arnold Rosenburg given at CIGIR'01 Sep. 9th-12th 2001, New Orleans, La., United States of America.

Figure 8:
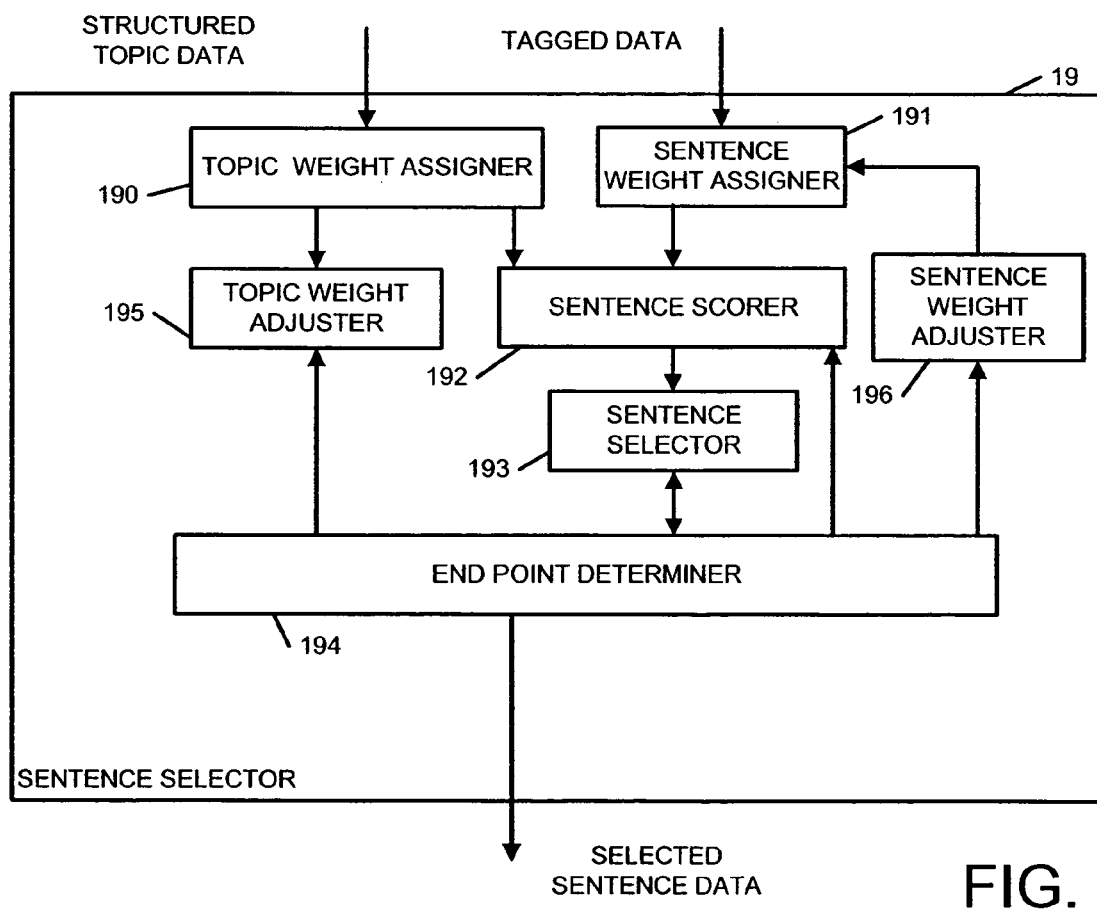
FIG. 8 shows a functional block diagram of a sentence selector of the text summarising apparatus shown in FIG. 1.

FIG. 8 shows a functional block diagram of the sentence selector 19.

The sentence selector 19 has a topic weight assigner 190 for assigning a weight to each topic in the identified topic data and a sentence weight assigner 191 for weighting sentences in the part-of-speech tagged data.

A sentence scorer 192 is arranged to score sentences in the document data in accordance with the assigned topic and sentence weights and a sentence selector 193 is provided to select the sentence having the highest score.

An end point determiner 194 is provided to determine whether the number of sentences remaining unselected has reach a pre-set limit and, if not, to cause a topic weight adjuster 195 to adjust the topic weights assigned by the topic weight assigner 190 so that the topic or topics in the selected sentence have a reduced or zero weighting and to cause a sentence weight adjuster 196 to cause the sentence weight assigner 191 to remove the selected sentence by setting its weight to zero.

The end point determiner 194 is thus arranged to cause the topic and sentence weights to be adjusted after each sentence selection and to cause the sentence scorer and sentence selector 192 and 193 to repeat the scoring and selecting operations until the end point determiner 194 determines that the number of sentences remaining unselected has reached the preset limit. In this case, the preset limit is a fixed number of sentences. As another possibility however, the number of sentences selected for the summary could be a percentage of the number of sentences within the document data.

This dynamic re-scoring of the sentences (due to the adjustment of the weightings) after each sentence selection enables a sentence to be selected for each identified topic and should enable a sentence first to be selected first that is relevant to the main topic then a sentence relevant to any significant subsidiary topic and lastly to any less significant subsidiary topic.

Figure 9:
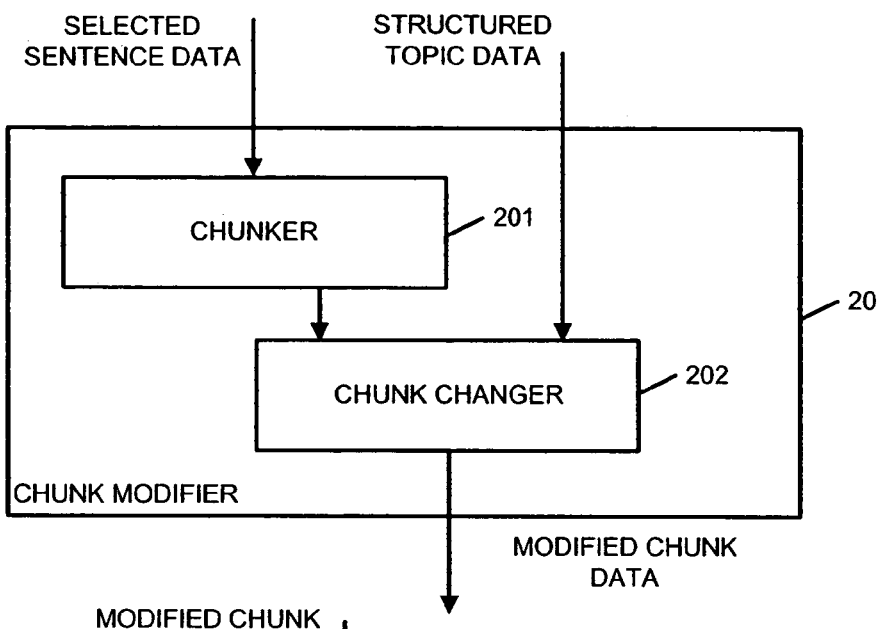
FIG. 9 shows a functional block diagram of a chunk modifier of the text summarising apparatus shown in FIG. 1.

FIG. 9 shows a functional block diagram of the chunk modifier 20.

The chunk modifier 20 has a chunker 201 which is arranged to arrange to chunk the part-of-speech tagged data by defining as chunks text delimited by punctuation marks such as commas, parentheses or hyphens. A chunk changer 202 is provided to change the chunked data to emphasise the chunks that contain words in the structured topic data. In this example, the chunk changer 202 is arranged to de-emphasise any chunk in the selected sentencers that does not contain words in the identified topic data so that these chunks appear less important to the user. The chunk changer 202 may achieve this by actually removing the chunks or de-emphasising their appearance.

Figure 10:
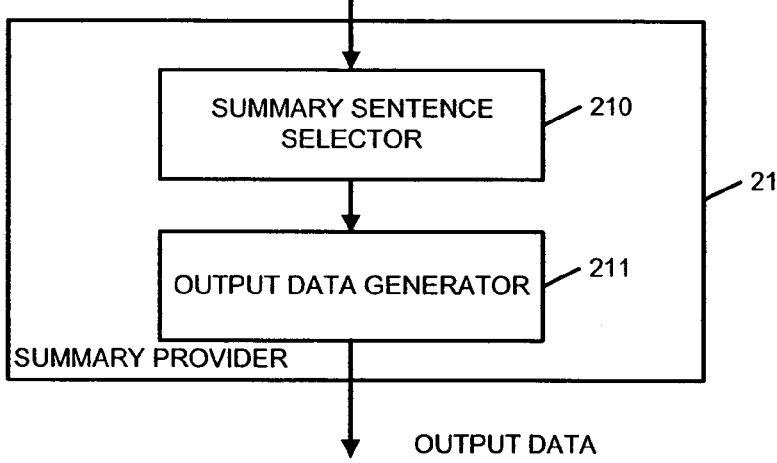
FIG. 10 shows a functional block diagram of a summary provider of the text summarising apparatus shown in FIG. 1.

FIG. 10 shows a functional block diagram of the summary provider 2.

In this case the summary selector comprises a summary sentence selector 210 which is arranged to select the sentences for the summary. These may be all of the sentences selected by the sentence selector 19 or a subset of those sentences where a smaller summary is required, for example because the summary is to be output to a small area display such as the display of a PDA or mobile telephone. In this latter case, the highest ranking sentencers may be selected from the sentences selected by the sentence selector with the number selected being predetermined, defined as a proportion of the original document data or related to scores associated with the sentences.

The summary sentence selector 210 is arranged to supply the selected sentences to an output generator 211 which is arranged to cause the sentences to be output for display either in the order in which they occur in the text or in the order in which the sentences are ranked by the sentence selector 19.

Figure 11:
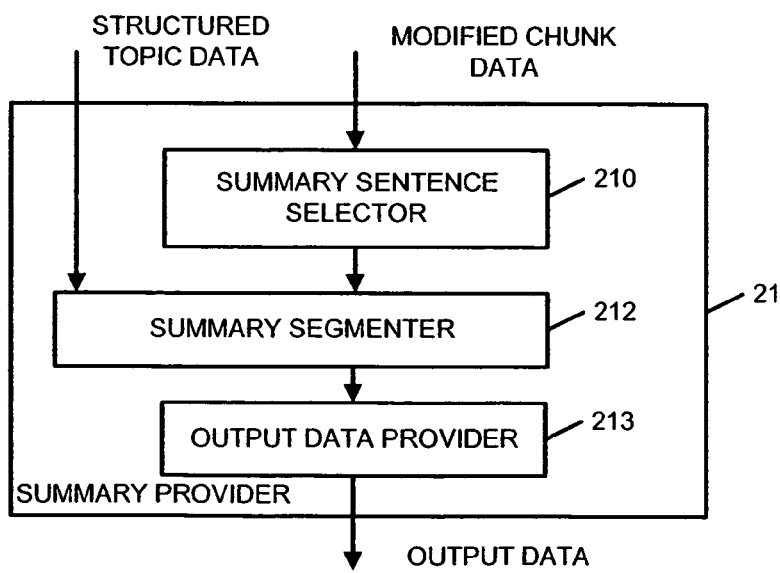
FIG. 11 shows a more detailed functional block diagram of one example of the summary provider.

FIG. 11 shows a more detailed block diagram of one example of the summary provider 21. As shown in FIG. 11, the output data generator 211 has a summary segmenter 212 which is operative, when the document data is found to be segmented into more than one main topic (that is the document data has a number of topics of equal or similar importance), to segment the selected sentence data into paragraphs with each paragraph corresponding to a topic segment of the original document data and an output data provider 213 which is arranged to output the selected sentences in the topic paragraphs with the selected sentences in a topic paragraph either in the order in which they occur in the corresponding part of the original document data or in accordance with their ranking.

The operation of the text summarising apparatus will now be described with the aid of FIGS. 12 to 33.

Document data to be summarised is provided by the data provider 10. This document data may be received by the data provider 10 electronically from another computing apparatus via the communications device 60, may be downloaded from a removable medium 35, may be accessed from the mass storage device 33 and/or may be input by a user using one or more of the input devices such as the keyboard or microphone 53 (if the text summarising apparatus also has access to speech recognition software) or the scanner 54 (if the text summarising apparatus has access optical character recognition software).

The controller 2 may be arranged to carry out the summarising process automatically once document data is provided by the data provider 10. Alternatively, and more usually, the controller 2 will initiate the text summarisation process in response to input by the user of a command using the keyboard 51 and/or pointing device 52 (or microphone 53).

The tokeniser 11 splits the document data provided by the data provider 10 into tokens, that is into individual words and punctuation, using a standard algorithm which detects boundaries between tokens by detecting delimiting characters or sequences of characters such as spaces, new line characters and punctuation marks.

The tokenised text data is then tagged by the part-of-speech tagger 12 which uses a statistical part-of-speech tagging method to assign a grammatical category (such as noun, verb, adjective, proper noun and so on) to each token in the tokenised text data. The part-of-speech tagger 12 achieves this by looking up in each word in the dictionary store 5a to identify, for each word, the corresponding part-of-speech. Where a word may represent more than one part-of-speech, then the part-of-speech tagger 12 accesses the contextual rules stored in the contextual rules store 54b to enable disambiguation of the part-of-speech in accordance with its context. Methods of carrying out part-of-speech tagging are described in a tutorial entitled "Trends in Robust Parsing" by Jacques Vergne of the Université De Caen of France dated 29 Jul. 2000 and available at http://users.info.unicaen.fr/~jvergne/tutorialColing2000.html and http://users.info.unicaen.fr/~jvergne/RobustParsing/Robust-ParsingCourseSlides.pdf.zip.

Once the tokenised text has been tagged by the part-of-speech tagger 12 then the controller 2 causes the phrase chunker 13 to identify phrasal chunks in the tagged data (s4 in FIG. 4). In this example, the phrase chunker 13 attempts to identify simple phrases such as noun-noun (for example "project leader"), adjective-noun (for example "black box") proper noun-proper noun for example ("John Smith"), noun-noun-noun (for example "Educational Authority Panel") by concatenating consecutive nouns, concatenating consecutive proper nouns and concatenating consecutive adjectives with the final nouns. Thus, in this example, the phrase chunker 13 uses no grammatical information in addition to the part-of-speech tags. Although this could sometimes result in incorrect processing, (for example the text "John gave the man books" would be erroneously processed to identify the noun phrase "man books") this is not usually a problem because erroneously identified phrases will occur sufficiently infrequently to be disregarded by the topic identifier.

In this example, because the switches SW1 and SW2 are in the position A, the concept fuser 14 is not used. Accordingly, once the phrase chunker 13 has completed its processing operation, then the controller 2 instructs the word frequency calculator 15 to calculate the number of times that each word occurs in the document data. The word frequency calculator 15 stores this data in the word frequency data store 15a.

Once the word frequency calculator 15 has calculated the word frequencies for all of the words, then the controller 2 instructs the co-occurrence significance calculator 16 to commence operation.

Figure 12:
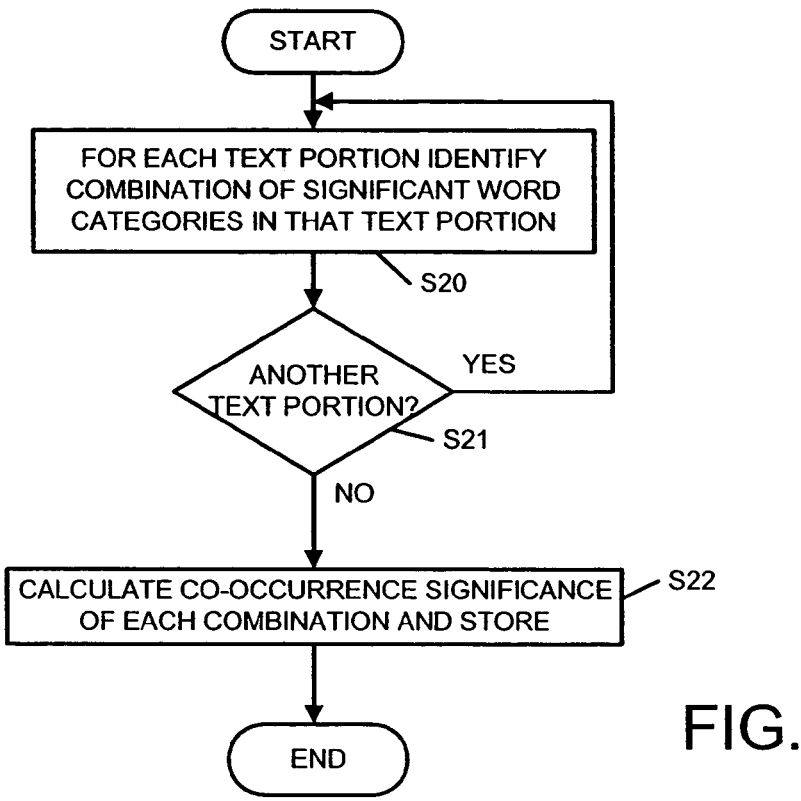
FIG. 12 shows a flowchart for illustrating operation of the co-occurrence significance calculator.

FIG. 12 shows a flow chart for illustrating the operation of the co-occurrence significance calculator shown in FIG. 5.

At S20, for each text portion in the part-of-speech tagged data, the word combination identifier 160 identifies combinations of significant words in that text portion. In this example the word combination identifier 160 is arranged to consider as significant words in the grammatical categories nouns, verbs and proper nouns. The word combination identifier 160 then identifies as co-occurrences any of the following combinations of those grammatical categories that occur in the same sentence, namely:

noun and verb
noun and noun
noun and proper noun
verb and proper noun
proper noun and proper noun.

These particular word categories and combinations are used because they are likely to include subject-verb and verb-object relationships that are not directly accessible if grammar rules are not used to analyse the text.

The word combination identifier 160 is arranged to ignore the order in which the two words of a combination occur so that, for example, the co-occurrences:

"bites" followed by "dog"; and
"dog" followed by "bites"

are considered as being identical. This allows the co-occurrence significance calculator 16 to obtain better results when there is sparse data or where the text is written in a language in which word order is variable enough to make any difference in order statistically insignificant.

At S21, the word combination identifier 160 checks to see whether there is another text portion to be processed and repeats step S20 until all text portions have been processed. When the answer at S21 is no, then at S22, the co-occurrence significance determiner 161 calculates the significance of occurrence of each combination identified by the word combination identifier 160 using as the significance measure the Likelihood Ratio. The resulting data is stored in the co-occurrence data store 16a so that significant co-occurrences within sentences are associated with corresponding scores determined by the co-occurrence significance determiner 160.

The restriction of the significant categories of words to those mentioned above should facilitate direction of the summary to information in which user are generally interested because, typically, users are interested in questions such as what, why, when, how, where, etc. and these questions are typically related to the nouns, verbs and proper nouns in the document data.

Figure 13:
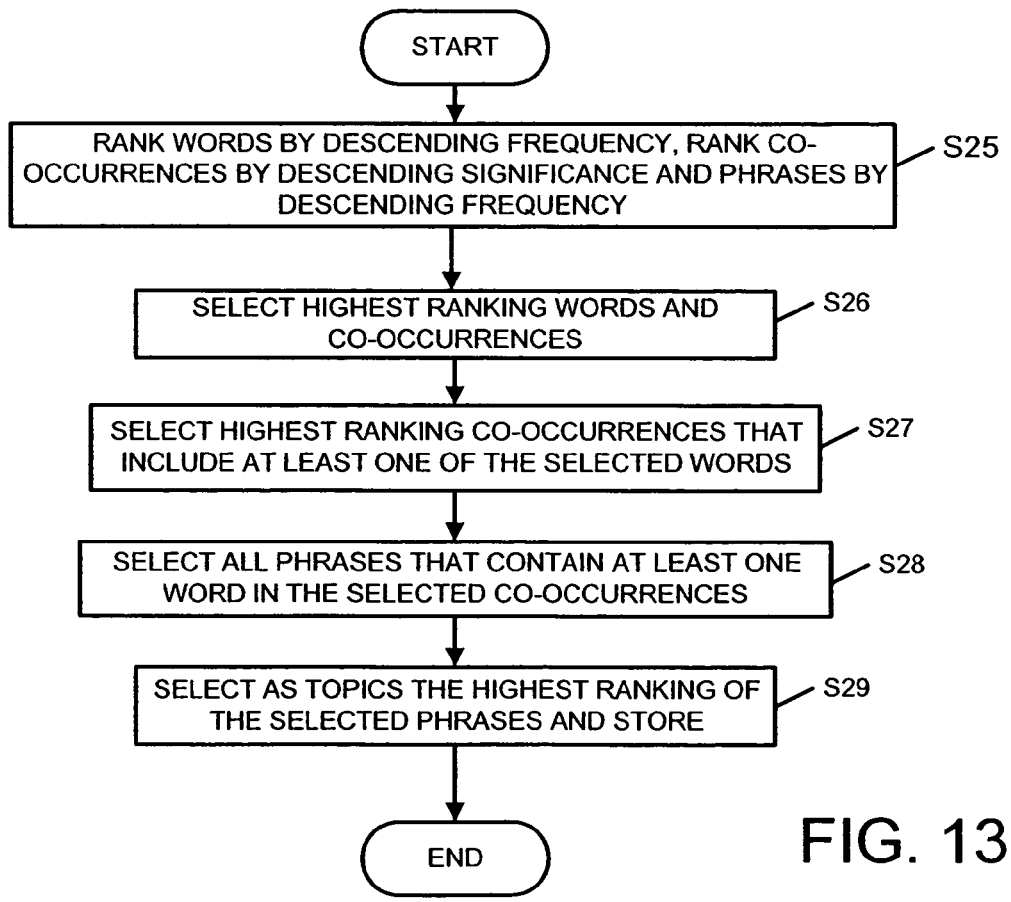
FIG. 13 shows a flowchart for illustrating operation of the topic identifier.

Once the co-occurrence data has been stored in the co-occurrence data store 16a, the controller 2 activates the topic identifier 17. FIG. 13 shows a flow chart for illustrating operation of the topic identifier 17 shown in FIG. 6.

At S25, the word ranker 171 and phrase ranker 170 rank or order the words and phrases, respectively, by descending frequency and the co-occurrence ranker 172 ranks the co-occurrences by descending order of significance (as measured by the Likelihood Ratio) to produce the ranked or ordered tables L1, L2 and L3 shown in FIGS. 14a, 14b and 14c. Thus, in the ranked word table L1 shown in FIG. 14a, W1 is the most frequently occurring word while in the word co-occurrence table L2 shown in FIG. 14b the co-occurrence W5-W7 is the most frequently occurring co-occurrence and in ranked phrase table L3 the phrase R1 is the most frequently occurring phrase.

At S26, the word selector 174 and the co-occurrence selector 175 select the top or highest ranking words and co-occurrences, respectively. In this example, the word selector 174 selects the ten most frequently occurring words while the co-occurrence selector 175 selects the five most frequently occurring co-occurrences as shown by the double headed arrows M1 and M2 in FIGS. 14a and 14b.

Then, at S27, the co-occurrence identifier 176 selects the ones of the selected top or highest ranking co-occurrences that include at least one of the selected words. This filters out any of the highest ranking co-occurrences that do not include any of the highest ranking words.

Then at S28, the phrase identifier 177 selects all of the phrases that contain at least one word from the co-occurrences selected at S27, that is the co-occurrence containing at least one of the highest ranking words.

Then at S29, the topic selector 178 selects as topics the top or highest ranking ones of the selected phrases. In this example, the topic selector 178 selects the top two or three highest ranking ones of the selected phrases as the topics for the document data as shown by the double headed arrow M3 in FIG. 14c.

This process enables phrases to be selected as topics that include words which are themselves not the most frequently occurring in the document data but which co-occur with the most frequently occurring words in the document data.

At the end of this processing, the topic identifier 17 has identified a number of phrases as topics for the document data and has stored data defining these topics in the topic data store 17a.

Once the topics have been identified, then the controller 2 instructs the structural analyzer 18 to analyse the topic data list to determine which of the identified topics are main topics and which are subsidiary (that is less important) topics within the document data.

FIG. 15 shows a flow chart for illustrating the structural analysis carried out by the structural analyser 18 shown in FIG. 7.

At S30 the structural analyser accesses the topic data list and part-of-speech tagged data and at S31 the text segmenter 180 splits the tagged data into topic segments using a standard algorithm known as text tiling which is described in the aforementioned paper entitled "Multi-paragraph segmentation of expository text" by Marti Hearst given at the 32nd annual meeting of the Association for computational linguistics 1994 and available at http://citeseer.nj.nec.com/hearst94multiparagraph.html.

Then at S32 the topic classifier 181 checks whether all of the topics in the topic data list have been processed and, if the answer is no, selects the next topic on the topic data list at S33. Then, at S34, the topic classifier 181 checks whether the selected topic occurs in a predetermined proportion of the text segments. In this example, the topic classifier 181 checks to determine whether the selected topic occurs in 80% or more of the text segments. If the answer at S34 is yes, then the topic classifier 181 classifies the topic as a main topic. If, however, the answer is no, then the topic classifier 181 classifies the selected topic as a subsidiary topic.

The topic classifier repeats steps S32 to S36 until the answer at S32 is yes, that is all of the topics in the topic data list have been classified as either main or subsidiary topics. This data is stored in the structured data store 18a.

This manner of identification of main and subsidiary topics is based on the recognition that in currently analysed document data sets such as news articles from the British Broadcasting Corporation website, main topics tend to occur throughout the document segments.

Once the structure of the document data has been analysed by the structural analyser to identify main and subsidiary topics and the resulting structured data stored in the structured data store 18a, the controller 2 causes the sentence selector 19 to select the sentences to be used for the summary.

FIG. 16 shows a flow chart for illustrating the sentence selection process carried out by the sentence selector shown in FIG. 8.

At S40, the sentence selector 19 accesses the tagged data and stores it as a sentence list SL0 in the sentence selector data store 19a and accesses the topic data and stores it as a topic data list TL1 in the sentence selector data store 19a.

Then at S41, the topic weight assigner 190 assigns a weight Qt to each topic and the sentence weight assigner 191 assigns first and second weights Qs and Qp to each sentence in the document data. In this example, the topic weight assigner 190 assigns main topics a weight of 3.0 and subsidiary topics a weight of 1.0. The sentence weight assigner assigns the first weight Qs to each sentence in accordance with the position of the sentence in the corresponding paragraph so that, in this example, the first sentence is assigned a weight of 1.0, the last sentence is assigned a weight of 0.8 and the other sentences are assigned a weight of 0.5 and assigns the second weight Qp in accordance with the position in the corresponding document of the paragraph containing the sentence so that, in this example, if the sentence is in the first paragraph, it is assigned a weight of 1.0, if the sentence is in the last paragraph it is assigned a weight of 0.8 and if it is in any other paragraph it is assigned a weight of 0.5.

These weightings are based on the realisation that the first and last paragraphs of a document tend to be more important as do the first and last sentences of a paragraph with the first paragraphs of a document and the first sentences of a paragraph tending to be slightly more important than the last sentence and paragraph, respectively.

At S42, the sentence scorer 192 checks to see whether the sentence list SL0 is empty and, as the answer is no, at S43 initialises a first working list SL1 to SL0 by copying the contents of SL0 to SL1 and sets a second working list SL2 to empty.

Then at S44 the sentence scorer 192 checks whether the first working list SL1 is empty and, as the answer is no, at S45 selects the next sentence S from the first working list SL1. Where the document has a title then in this case, the title will be considered as the first sentence in the document.

Then, at S46, the sentence scorer 192 calculates the score for the sentence S and at S47 adds the sentence S and its score to the second working list SL2 and removes that sentence from the first working list SL1.

The sentence scorer 192 repeats steps S44 at S47 until the answer at S44 is yes at which time the sentence scorer 192 will have calculated a sentence score for each sentence S in the sentence list SL1. When this is the case, that is the answer at S44 is yes, then at S48 the sentence selector 193 ranks or orders the sentences in the second working list SL2 in accordance with the scores calculated at S46 and at S49 adds the top or highest scoring sentence St to a third working list SL3.

At S50 the end point determiner 194 checks to see whether the third working list SL3 includes the required number of sentences and, if the answer is no, at S51 causes the sentence weight adjuster 196 to instruct the sentence weight assigner 191 to set the weight for the selected sentence St to zero to remove the sentence St from the sentence list SL0. Then, at S52, the end point determiner 194 instructs the topic weight adjuster 195 to cause the topic weight assigner 192 to set the weight of any topic in the selected sentence St to zero so effectively removing that topic or topics from the topic list TL1.

The sentence selector then returns to S42 and repeats S42 to S52 until the end point determiner 194 determines at S50 that the sentence list SL3 includes the required number of sentences (in this example, the required number is a preset number but it could be a percentage of the total number of sentences in the document). When the present number of sentences is present in the list SL3, then the end point determiner 194 outputs at S53 the selected sentence list SL3 (which includes the associated scores) to the selected sentence data store 19.

The dynamic re-scoring of the sentences after each sentence selection enables a sentence to be selected for each identified topic and should enable sentences to be selected from each of the topics in turn in accordance with the weight of the topic so that a sentence is selected first for the main topic or topics and then for subsidiary topics at significant locations within the document and finally for the remaining subsidiary topics.

FIG. 17 shows a flow chart for illustrating in greater detail the calculation at S46 in FIG. 16 of a sentence score by the sentence scorer.

At S60 in FIG. 17, the sentence scorer 192 accesses the topic list TL1 and the sentence S. Then, at S61, the sentence scorer 192 sets a working topic list TL2 to TL1 by copying the data from topic list TL1 to TL2.

At S62 the sentence scorer sets the score for sentence S to the weight Qs for the position of the sentence S in its paragraph and at S63 adds to that score the weight Qp for the position of the paragraph containing the sentence in the document.

Then at S64 the sentence scorer 192 checks to see whether the list TL2 is empty and if not selects the next topic T in the topic list TL2 at S65.

The sentence scorer 192 then checks at S66 whether the topic T occurs in the sentences and if the answer is yes increments the score for the sentence S with the weight Qt for the topic T. The sentence scorer repeats steps S64 to S67 until the answer at S64 is yes at which point the sentence scorer 192 outputs at S68 the final score for that sentence and proceeds to steps S47 as described above.

The procedure shown in FIG. 17 is carried out for each sentence in the list SL0.

In this example, when the sentence selector 19 has completed its operation, the controller 2 activates the chunk modifier 20. FIG. 18 shows a flowchart illustrating operation of the chunk modifier 20 shown in FIG. 9.

At S80 in FIG. 18 the chunk modifier 20 accesses the structured data store 18a to obtain the topic list TL1 and accesses the selected sentence data store to obtain the list SL3 of selected sentence.

At S81 the chunker 21 checks whether all the sentences in the sentence list SL3 have been processed and, as the answer is no, at S82 splits the first sentence S1 into a list of chunks CL1 at S82. In this example, the chunker 201 splits the sentence into chunks by identifying punctuation marks in the selected sentence data so that separate chunks are defined as text bounded by commas, parentheses or hyphens. This method of chunking has previously been proposed for use in text-to-speech systems for example in the Festival Speech Synthesis System as described in section 9.1 of the manual for that system as available on 20 Nov. 2002 at http:// www.cstr.ed.ac.uk/projects/festival/manual/festival_ 9.html.

As an illustration of this method of chunking consider:

"The defendant, talking from the dock, claimed-belatedly-that he was not in the vicinity of the incident (at the time of the crime)."

In this case, the chunking process would yield the following chunks:

The defendant
, talking from the dock,
claimed
—belatedly—
that he was not in the vicinity of the incident
(at the time of the crime)

When the chunker 201 has split the sentence SS into a list of chunks, then the chunk changer 202 checks at S83 whether the list CL1 is empty. As this is not the case, then at S84 selects the next chunk from the chunk list CL1.

At S85 the chunk changer 202 checks to see whether the chunk contains a topic in the topic list TL1. If the answer is yes then at S86 the chunk changer 202 adds the chunk to the end of a new chunk list CL2. If, however, the answer is no, then the chunk changer 202 modifies the chunk and adds the modified chunk to the end of the list CL2. In this example, the chunk changer 202 modifies the chunk at S87 by replacing the chunk by ellipsis.

The chunk changer 202 repeats steps S83 to S87 until the chunker CL1 is empty at which stage all of the chunks of the current sentence S will be processed by the chunk changer 202.

When the answer at S83 is yes, then the chunk changer 2020 outputs the modified chunk list CL2 at S88 and then returns to S81 and repeats S81 to S88 until all of the selected sentences have been processed, that is the answer at S81 is yes, at which time the modified chunk data store 20 will contain a modified chunk list CL2 for each of the sentences selected by the sentence selector 19.

Once the chunk modifier 20 has completed the chunk modification, the controller 2 activates the summary provider 2 to generate the summary for output to one or more of the output devices. In this example, the summary provider 2 is arranged to output the summary to the display 40.

Operation of the summary provider 21 shown in FIG. 10 will now be described.

In this example, the summary sentence selector 210 accesses the modified chunk data stored in the modified chunk data store 20a and selects the highest ranking sentences in accordance with a predetermined criterion. In this example the summary sentence selector 210 selects a predetermined number of the sentences. As alternative possibilities, the summary selector 210 may select the sentences so that the number of sentences selected is a predetermined proportion of the total number of sentences in the document data or may select the sentences in accordance with the scores associated with the sentence.

The output data generator 211 then formats the sentence data for display either in the order in which the sentences occur in the text or in accordance with their respective scores. As a further possibility, the output generator 211 may be arranged to order the sentences in accordance with the topic structured data so that the sentences are grouped according to the topic or topics associated with the sentences.

FIG. 19 shows a flowchart for illustrating operation of the summary provider when, as shown in FIG. 11, the summary segmenter 212 is provided. In this case, at S90, the summary sentence selector 210 selects the highest ranking sentences as described above. Then, at S91, the summary segmenter 212 accesses the structured topic data to determine the number of main topics identified by the structural analyser 18. If the summary segmenter 212 determines that there is more than one main topic at S91 then, at S92, the summary segmenter 212 determines which of the selected sentences are associated with each main topic and then segments the selected sentences into paragraphs such that each different paragraph contains the sentences associated with a different main topic.

If, however, at S91 the summary segmenter 212 determines that there is only one main topic then the summary segmenter 212 orders the selected sentences as described above.

At S94, the output data provider 213 of the output data generator outputs the summary data to the output device, in this case the display 42.

FIG. 20 shows an example of a display screen 200 displayed by the display 42 when the summary segmenter 212 has segmented the summary data into paragraphs. As can be seen from FIG. 20 the summary segmenter has identified three topics T1 to T3 which form headings of respective paragraphs 201, 202 and 203 containing the sentences selected by the summary sentence selector that relate to that topic (in the interests of simplicity in FIG. 20 the actual text displayed is represented by dotted lines).

This segmentation of the summary into separate main topics enables a user easily to see the structure of the document and to identify the individual topics so facilitating identification and the location of a particular topic within, for example a long document.

In the example described above, the chunk modifier 20 operates (as explained with reference to FIG. 18) to modify chunks in the sentences selected by the sentence selector 19 that do not contain any of the topics by replacing those chunks with ellipsis so that the summary displayed by the display 42 displayer ellipsis where the chunk modifier 20 has modified a chunk.

This replacement of chunks that are not pertinent to the identified topics reduces the overall length of the summary and should assist the user in grasping quickly the content of the document data that has been summarised. In addition, this shortening of overall length of the summary, should facilitate display of the summary on small area displays such as are available on PDAs and mobile telephones.

A user having appreciated the general content of the summary may be interested in further information and may, in particular, wish to see the omitted chunks. Accordingly, the summary provider 2 is arranged to enable the user to access the omitted chunk data as will now be explained with the aid of the flow chart shown in FIG. 21.

Thus, the summary provider 2 checks at S95 in FIG. 21 whether a summary is being displayed. If the answer is yes then at S96 the summary provider 21 checks whether the user has positioned the cursor of the pointing device 52 over ellipsis in the displayed summary. If the answer is no then the summary provider 21 returns to step S95 until the summary is no longer displayed. Thus the summary provider 21 continually monitors the display to determine the position of the cursor of the pointing device 52.

When the answer at S96 is yes, that is the user has positioned the cursor over ellipsis in the displayed summary, then at S97 the summary provider accesses the omitted chunk data from the chunk data store 20a and causes the display 42 to display the omitted chunk until, at S98, the summary provider determines that the user has moved the cursor away from the ellipsis.

FIG. 22 shows a display screen 210 for illustrating one way in which the summary provider 21 may display the omitted chunks. As an illustration, only part of the summary is shown, that is the sentence used above to explain the operation of the chunker 201. Thus, the displayed summary includes the texts:

"The defendant . . . claimed . . . that he was not in the vicinity of the incident".

that is the chunks not containing the identified topics are replaced by ellipsis as described above with reference to FIG. 18.

In this case, when the summary provider determines at S96 that the cursor 52a of the pointing device 52 is over an ellipsis, the summary provider causes that chunk to be displayed in a pop-up window 212. Thus in the example shown in FIG. 22, the cursor 52a is placed over the first ellipsis in the displayed text and the summary provider 21 causes the text:—

"talking from the dock"

to be displayed in the pop-up window 212.

FIG. 23 shows another display screen 215 to illustrate another way in which the summary provider 21 may display an omitted chunk when the cursor 52a is positioned over an ellipsis in the displayed text 211. In this case, when the summary provider 21 determines that the cursor 52a has been placed over an ellipsis, the summary provider 21 causes a second window 216 to appear in which the entirety of the sentence, including all of the chunks that were replaced by ellipsis, is displayed; This has the advantage that the user can easily see the full sentence and does not need to move the cursor 52a from ellipsis to ellipsis to read the entire text. As another possibility, where the size of the display screen is sufficiently large, the summary provider may cause the entirety of the summary to be displayed in the pop-up window 216.

As described above, the chunk modifier 20 replaces chunks not relevant to the identified topic or topics with ellipsis. As another possibility the chunk modifier may modify the chunks not pertinent to the identified topics by de-emphasising their appearance relative to the remaining chunks.

Figure 24:
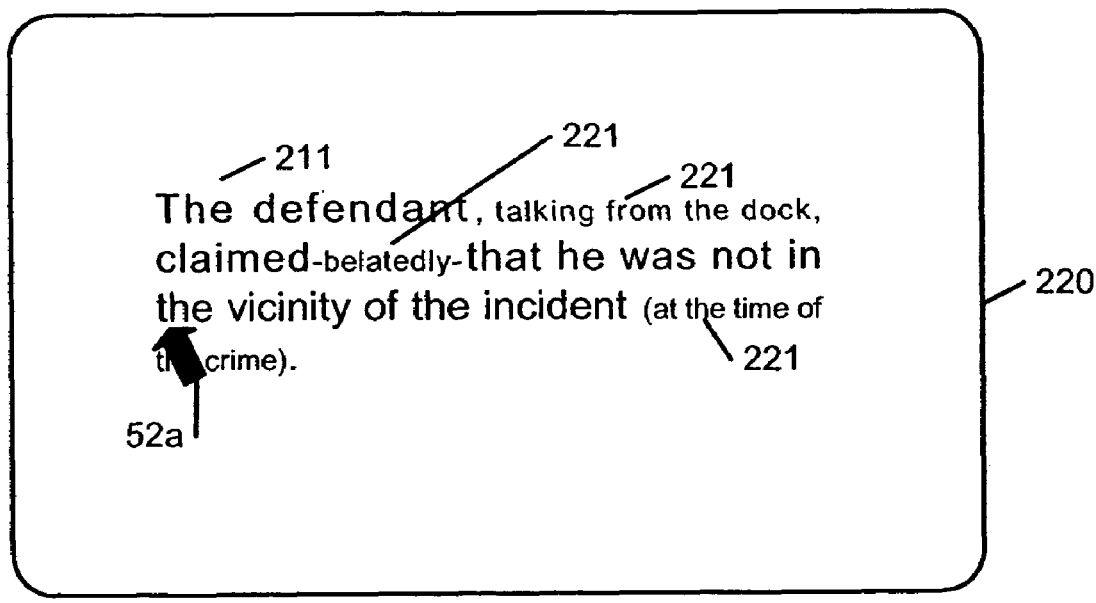

FIG. 24 shows a display screen 220 to illustrate the summary displayed by the summary provider 21 when the chunk modifier has, rather than replacing chunks 221 by ellipsis, reduced the font size of those chunks relative to the remaining chunks so that the user can still read the entire text of the summary but the portions of the summary relevant to the identified topic are emphasised. As another possibility or additionally, the chunk modifier may cause the chunks 221 not pertinent to the identified topics and the remaining chunks to have different font characteristics other than or in addition to font size. For example, the chunks pertinent to the identified topics may be displayed in bold or italics whilst the chunks not pertinent to the identified topics may be displayed in normal type. As a further possibility the two different types of chunks may be displayed in different colours with a brighter or more clearly visible colour being used for the chunks pertinent to the identified topics.

In some examples of text, chunks may be nested, that is a portion of text in parentheses may include a portion of text bounded by commas and so on. For such text, the chunk modifier 20 can be arranged to identify different levels of chunks to enable the summary provider 21 to display summaries of different levels of detail.

Figure 25A:
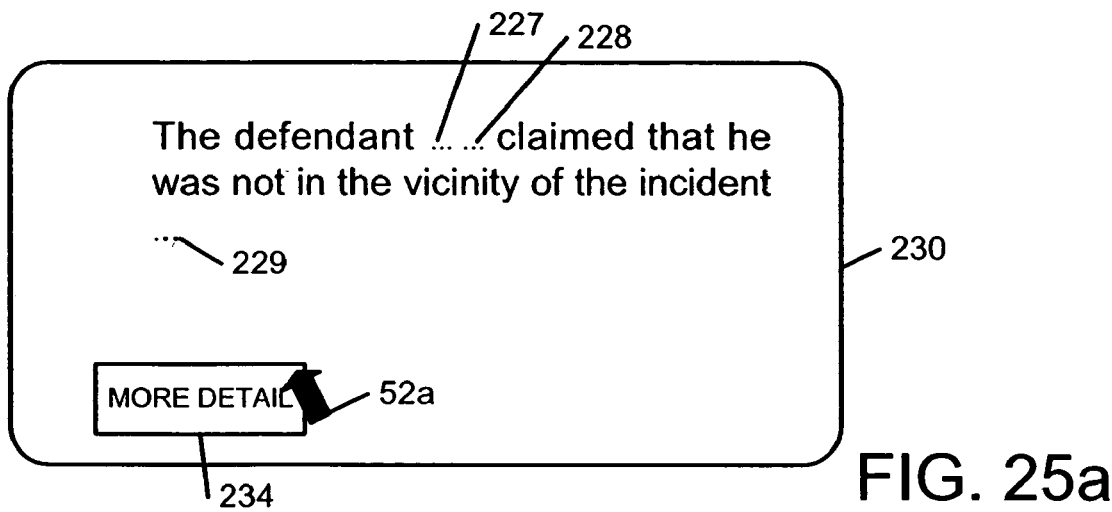

Thus, for example, if the sentence referred to above was re-phrased as:

"The defendant, talking—belatedly—from the dock, claimed that he was not in the vicinity of the incident (at the time of the crime)"

then the summary provider 21 may be arranged to display as a top level summary a summary in which all of the chunks not pertinent to the identified topic or topics are replaced by ellipsis as shown by the display screen 230 in FIG. 25*a* in which three sets of ellipsis 227, 228 and 299 are present.

Figure 25B:
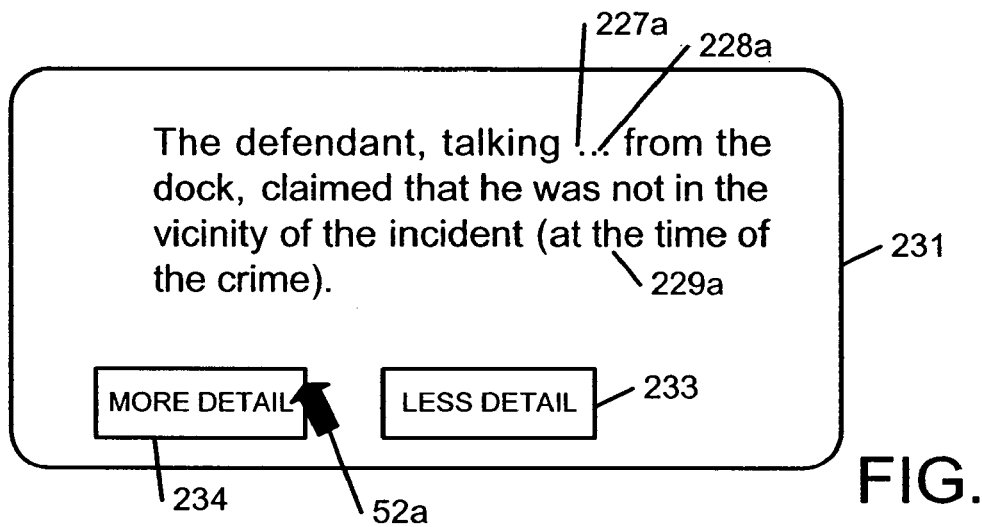

In this case, if the user then positions the cursor 52*a* over, for example, the set of ellipsis 227 or selects a button 234 labelled "more detail" then the summary provider 21 accesses the text for the first level of omitted chunks and re-displays the summary as shown by the display screen 231 in FIG. 25*b* so that the ellipsis 227 and 229 are replaced by the omitted chunks 227*a* and 229*a*:

,talking from the dock, and
(at the time of the crime), respectively.

When the more detailed summary shown in FIG. 25*b* is displayed, then the user may elect to return to the display screen 230 by selecting a "less detail" button 233 or may request further detail by selecting a "more detail" button 234 or by positioning the cursor 52*a* over the ellipsis 228.

Figure 25C:
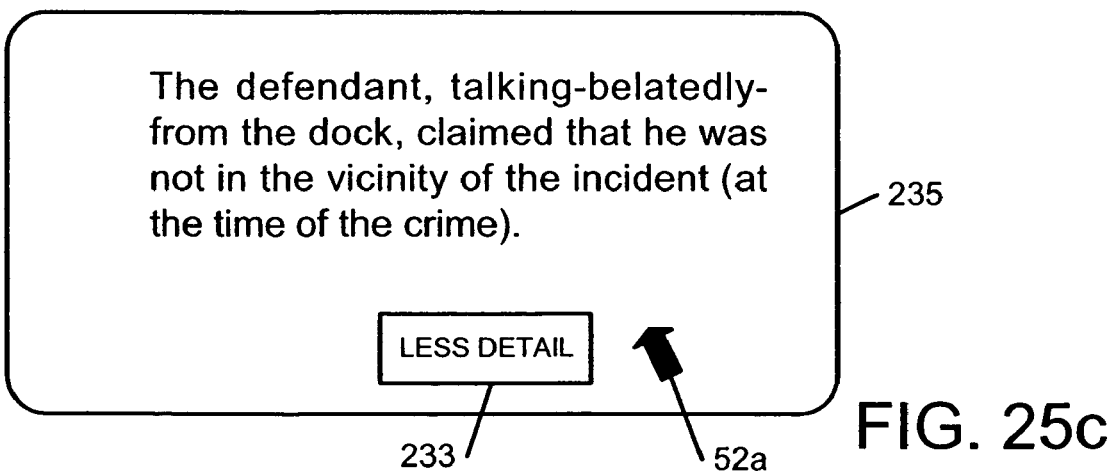

In this case, when the user elects to see more detail then the entirety of the summary will be displayed as shown in the display screen 235 shown in FIG. 25*c*. The user may have the option to return to a less detailed summary by selecting the "less detail" button 233.

This option enables a user rapidly to scan the higher level summary and to decide whether or not to see a more detailed summary.

In the above described examples, the chunk modifier eliminates or modifies chunks when they are not relevant to the identified topics. As a further possibility, to give different levels of granularity or detail of summary, the chunk modifier may be arranged to provide different levels of chunk modification or elimination so that, for the highest or most general level of summary, chunks may be eliminated or modified if they relate to, for example, less important subsidiary topics in the document data with the topics for which chunks are modified or eliminated being determined by, for example, upon the desired length of summary which in turn may depend upon the screen size of the display. In this case, the summary provider 21 may enable a user to move between less detailed and more detailed summaries in a manner similar to that described with reference to FIG. 25*a* to 25*c*.

As an alternative or addition to providing different levels of summary by eliminating or modifying different levels of nested chunks, the output data generator 211 of the summary provider may be arranged to provide a capsule summary containing key phrases.

In a simplest example, the summary sentence selector 210 of the summary provider may be arranged to select just the first sentence, that is the title of the document data, and the output data generator 211 may be arranged to access the structured topic data and to generate a summary consisting simply of the first sentence or title and the phrases forming the topics or simply the main topics of the document data so that, for example, in the case of an article concerned with passenger health the summary provider may cause the display to display a capsule summary as follows:

Article title:
"Airlines neglect passenger health"
Capsule summary:
Air travel:
Plane safety:

Such a capsule summary may, however, provide a user with insufficient information. FIG. 26 shows a flow chart for illustrating a method producing a capsule summary that provides a user with more information.

In this case, the output data generator of the summary provider accesses the structured topic data to obtain a topics list TL1 at S100 and at S101 checks to see whether TL1 is empty, that is whether all topics in the structured topic data store have been considered.

When the answer at S101 is no then at S102 the summary provider selects the next topic in the topic list TL1 and at S103 outputs topic T to a display data file in the summary data store 21*a*.

Then, at S104, the summary provider accesses the co-occurrence data store 16*a* and selects all co-occurrences containing at least one word in topic T and at S105 selects all words not in topic T from the selected co-occurrences to create, for each selected co-occurrence, a list of sub-items U1 . . . UM and at S106 outputs sub-item data U to the display data file. The summary provider then repeats S101 to S106 until all topics have been selected at which stage the display data file will have data associating each topic with a list of sub-items. When this is the case, then at S109 the summary provider causes the display to display the data in the display data file.

In the example described with reference to FIG. 26, the summary provider 21 provides a capsule summary in which each topic is associated with any sub-items. The summary provider may, however, provide a more detailed capsule summary by allocating to each sub-item an associated word list WL1. FIG. 27 shows the procedure carried out at S106 in FIG. 26 for each sub-item to associate it with a word list WL1.

Thus at S107 the summary provider selects the co-occurrences which reference the sub item U. Then at S108 the summary provider creates a list WL1 of words which co-occur with the sub item U. The summary provider may then rank or order the word list WL1 by descending co-occurrence significance. At S108a, the summary provider checks whether there is another sub-item and if so repeats S107 and S108 until each sub-item has been associated with a corresponding word list WL1. Then at S109, the summary provider outputs to the display data file each sub item U1 . . . UM for the topic T associated with the corresponding word list WL1.

Optionally, at S107 the length of the word list WL1 can be restricted by selecting only a predetermined number of the highest ranking co-occurrences. Additionally or alternatively the length of the word list WL1 can be restricted by selecting at S109 only the highest ranking words in the ranked word list WL1 when the word list is ranked.

Alternatively or additionally the list of words WL1 may be filtered by identifying for each word W co-occurrences which contain that word and removing from the list WL1 any words W having only co-occurring words W' which do not co-occur with corresponding sub-item U. FIG. 28 shows a flow chart for illustrating this in more detail.

Thus, at S110, the summary provider gets the word list WL1 for a sub-item U and then, at S111, the summary provider checks whether WL1 is empty and if not selects the next word W from WL1 at S112. Then at S113, the summary provider 21 accesses the co-occurrence data store extract and ranks all co-occurrences mentioning W in accordance with their co-occurrence significance to create a list CL4. Then at S114 the summary provider checks whether the sub item U occurs in the list CL4. If the answer is no, then the summary provider scores the word W as zero effectively removing the word W from the list WL1 (S115). If however the answer at S114 is yes, then at S116, the summary provider scores the word W as 1/N where N is the position in the list CL4 where "W" occurs.

After either S115 or S116, the summary provider adds W and its score to a list CL3 in which the words W are maintained in score order at S117 and then repeats steps S111 to S116 until each word in the list WL1 for the sub item U being considered has been processed.

Then at S118 the summary provider preserves up to K of the entries in the list CL3 and discards the rest and at S119 outputs the list CL3 as the new list WL1 associated with that sub-item.

The summary provider repeats the steps shown in FIG. 28 for each sub-items U for a topic so that, at the end of this process, each sub-item is associated with a new list WL1 which consists only of the words W that have co-occurrences that reference the sub-item U and which is ordered in accordance with the score determined by the position of U in the list CL4 so that words for which U is of less significance are less highly ranked. This should restrict the word list to those words which are most relevant to the sub-item.

FIG. 29 shows an alternative technique for outputting the word list WL1 to the display data file at S106 in FIG. 26.

Thus, at S120, the summary provider outputs the sub-item U. Then, at S121, the summary provider selects from the co-occurrence data store the highest ranking co-occurrences which reference the word or sub-item U.

Then at S122, the summary provider creates a list WL1 of words that co-occur with U in the selected co-occurrences and at S123 ranks the word list W1 by descending order of co-occurrence significance.

Then, at S124, the summary provider checks whether the list WL1 of words W is empty and, if not, selects the next word W in WL1 at S125 and at S126 selects the top ranking co-occurrences from the co-occurrence data store which reference the word W. Then, at S127 the summary provider checks whether the word W is in the selected set of top ranked co-occurrences and if the answer is yes outputs the word W to the display data file at S128. If, the answer at S127 or after 128, is no, the word W is discarded at S129. The summary provider then repeats S124 to S129 until the answer at S124 is yes at which point each word W in the word list WL1 for which the highest or top ranking co-occurrences include the word U will have been output to the display data file. Thus, in this case, only the top N ranking co-occurrences are selected and a word W is output to the display data file only if the associated sub-item U occurs in the highest ranking co-occurrences for that word W (S126 in FIG. 29).

The provision of a capsule summary as described with reference to FIGS. 26 to 29 is particularly beneficial when the display is of small area or the user prefers a summary having a small amount of text. This particular method of presenting a capsule summary works particularly well to complement article titles so as to explicate the content of articles such as newspaper headlines which tend to be biased towards attracting readers rather than maximising information regarding the content of the article and compliments the title because it biases the content of the summary towards information content not in the title. This may also be achieved by considering the title separately so that it is not included in the data used to form the capsule summary.

In the examples described above with reference to FIGS. 23 to 25c, the full text of a summary having chunks omitted could be displayed in a pop-up window. A similar technique could be used in the case of a capsule summary so that, for example, when a capsule summary of the type described above with reference to FIGS. 26 to 29 is displayed to the user, the user has the option by positioning the cursor on a selected part of the display screen, for example on a button marked text summary to have the full text summary displayed in a pop-up window. As a further possibility the summary provider may be arranged to provide in the pop up window only the part of the text summary related to the word or term of the capsule summary over which the cursor is placed.

FIG. 30 shows a display screen 240 of a capsule summary produced by one of the methods described above with reference to FIGS. 28 to 29 in which the summary provider 21 is arranged to cause the display to display the title 240 followed by the two phrases "air travel" and "plane safety" 242a and 242b representing the main topics of the document data with each main topic being associated with any sub-items 243 and any sub-item being associated with any word list 244. In the example shown, there are no sub items for the topic "air travel" but the topic "plane safety" has the sub item "dimensions" and "passenger" with the sub-item "dimensions" having the word list "authority, seat" and the sub-item "passengers" having the word list "fly".

FIG. 31 shows an example of a display screen 250 that the summary provider causes the display to display to a user when the user positions the cursor 52a over a part of the capsule summary shown in FIG. 30. As can be seen in FIG. 31, in this case the summary provider provides a pop-up window 251 in which the text summary in its entirety is displayed (the actual words are not shown but are represented by dotted lines).

In the above described examples, the text summarising apparatus is configured to provide text and/or capsule summaries by identifying topics in the document data to be summarised.

The present invention may also be applied where the topics are not topics identified by the text summarising apparatus items but rather are query or search terms entered by a user using one or more of the input devices 50 to search document data which has already been processed to enable text summarisation or at least has been processed to provide tagged data.

In order to enable such query based summarisation, as a first step, the controller 2 causes the display 42 to display a query input screen to the user to enable the user to input query terms. FIG. 32 shows an example of such a query input display screen. In the example shown, the query input display screen has four data entry boxes 261, 262, 263 and 264 enabling a user to define query/search terms that:
1. must be present in the document data;
2. must not be present in the document data;
3. all must be present in the document data; and
4. any may be present in the document data, respectively.

The data entry windows 261 to 264 may be windows into which the user enters data using the keyboard. As another possibility, these windows may be drop menus from which the user can select search or query terms using the pointing device 52.

The queries or search terms input by the user take the place of the topics described above and accordingly in this embodiment the topic identifier 17 and structural analyzer 18 are dormant and may be omitted if the apparatus is not also to be used for text summarisations. In this case, the data stored in the structured data store 18a are the query terms entered by the user.

FIG. 33 shows a flow chart illustrating the operations carried out by the text summarisation apparatus when the user selects the process button 265 in FIG. 32.

At S130 the controller 2 receives the query terms and stores these in the structured data store 18a.

Then at S131, the controller 2 causes the co-occurrence significance calculator 16 to identify in the document data co-occurrences containing the query forms, to calculate the co-occurrence significance for each query term and then to identify the significant co-occurrences for each query term wherein, this example, significant means the n highest scoring co-occurrences or the first n co-occurrences.

Then, at S132 in FIG. 33, the sentence selector 19 ranks the sentences in the document data using a scoring function different from that described above and weighted to prefer query terms, namely:

$$Qp+Qs+Qt1+Qt2+\ldots+Qci+Qcj+\ldots$$

where $Qp$ and $Qs$ are the sentence weights allocated to the sentence by the sentence weight assigner 191 by virtue of the position of the sentence in the paragraph and by virtue of the position of the paragraph in the document, $Qti$ is a positive value for each co-occurrence term $ti$ found in the sentence and $Qck=Ck/C1$ where $Ck$ is the likelihood ratio value for the co-occurrence $Ck$ and $C1$ is the likelihood ratio value for the highest ranking co-occurrence in the document data.

In this example, the topic weight assigner 190 shown in FIG. 9 may be arranged to allocate weights to the query terms in accordance with the data entered by the user into the windows 261 to 264 so that, for example, a query term entered into the window 261 may have a higher weighting than a query term in the window 264 and a query term in the window 262 may have a negative weighting. In this case, the sentence selector does not require the topic weight adjuster 195, sentence weight adjuster 196 and end point determiner 194 and these may be omitted if the apparatus is not also to be used for text summarisation. Alternatively the end point determiner 194 may be controlled by the controller 2 to disable the iteration functions and to supply the sentences selected by the sentence selector 19 directly to the summary provider 21 (after modification of chunks by the chunk modifier 20 if provided).

The sentence selector selects the highest scoring sentences and returns these as the results of the query. Again, if the chunk modifier is provided then chunks not containing the query terms or co-occurrences of the query terms may be replaced by ellipsis.

As mentioned above, query terms that the user requires not to be present in the document data may be assigned negative weighting. In addition, where query terms are linked by a logical or, that is query terms entered into the window 264, then these may be provided with lower weightings than query terms in the window 261, that is than query terms that the user requires to be present in the document.

As described above, the concept fuser 14 is not used. However, where the concept fuse is present (that is activated by selecting position B of the switches), then the above process is modified because once the phrase chunker 13 has completed its processing, the controller 2 will activate the concept fuser 14 which then accesses the lexical database 6, for example, the "WordNet" lexical database mentioned above which divides the lexicon into five categories (nouns, verbs, adjectives, adverbs and function words) but contains only nouns, verbs, adjectives and adverbs. WordNet organises lexical information in terms of word meanings and resembles a thesaurus but in which words forms are represented in strings of ASCII characters and senses are represented by a "synset", that is a set of synonyms which refer to a common semantic concept. Where a word has more than one meaning, then it may be present in more than one synset. A list of pointers is attached to each synset which expresses relationships between synsets. These relationships include words with opposite meaning (antonyms), generalisation of word (hypernyms), specifications of words (hyponyms), whole to part-whole correspondences (meronyms), part to part-whole relationships (homonyms), implied relations between nouns and adjectives (attributes), causes of other actions (causes) and implications of other actions (entailments).

Thus the WordNet lexical database defines sets of synonyms and relationships between synonyms.

Other forms of lexical databases such as Roget's on-line thesaurus may be used.

The concept fuser 14 is arranged to identify for each noun in the tagged text data, any synonyms available in the Wordnet lexical database. The concept fuser 14 thus finds groups of nouns wherein each groups contains nouns which are synonyms of one another or which share a synonym. The concept fuser 14 thus defines a number of concepts within the document data.

The operation of the remaining functional components of the text summary apparatus is the same as described above except that the word frequency and co-occurrence calculator process concepts provided by the concept fuser rather than the words in the tagged data. As described above, the concept fuser is arranged to process the tagged data to define concepts. As another possibility, the concept fuser may act on the phrase chunker data to identify concepts relating to the phrases.

Although the use of the concept fuser is not essential, it can help improve the quality of the resulting family especially where the text to be summarised is relatively short so that the data available for statistic analysis is small.

In one aspect the present invention provides apparatus for identifying topics in document data, the apparatus comprising:
  word ranking means for ranking words in order of frequency of occurrence in the document data;
  co-occurrence ranking means for ranking co-occurrences of words in order of significance;
  phrase ranking means for ranking phrases in order of frequency of occurrence in the document data;
  words selecting means for selecting a number of the highest ranking words;
  co-occurrence identifying means for identifying which of a number of the highest ranking co-occurrences contain at least one of the highest ranking words;
  phrase identifying means for identifying the phrases containing at least one word from the identified co-occurrences; and
  phrase selecting means for selecting a number of the highest ranking ones of the identified phrases.

Using the co-occurrences on words enables public phrases to be identified that accurately reflect the content of the document data.

As described above, the selected number of highest ranking words may be a predetermined number, for example 10. As another possibility, the selected number may be determined as a significant percentage of the words in the document data or as a percentage of the number ranked words. Similarly the selected number of highest ranking co-occurrences may be a predetermined number, for example 5 or may be a percentage based on the document data length or on the number of ranked co-occurrences. Also, the selected number of highest ranking phrases may be a predetermined number.

In the above described embodiments phrases are identified in part-of-speech tagged text data by concatenating consecutive nouns, concatenating consecutive proper nouns, and concatenating consecutive adjectives with a final noun. However, other shallow parsing and deep parsing methods of identifying phrases may be used.

In the above described embodiments words and phrases are ranked in order of frequency of occurrence. Individual words and phrases may, however, be weighted in accordance with their position in the document data.

In one aspect, the present invention provides co-occurrence significance calculating apparatus for use in text summarisation apparatus, the co-occurrence significance calculating apparatus comprising:
  co-occurrence determining means for determining word co-occurrences in document data
  combination identifying means for identifying word co-occurrences representing particular combinations of categories of words; and
  significance calculating means for calculating a significance measure for the identified co-occurrences.

In one aspect the present invention provides apparatus for searching document data, the apparatus comprising:
  receiving means for receiving query terms supplied by a user;
  significance determining means for determining for each query term, co-occurrences in the document data; and
  outputting means for outputting parts or portions of the document data containing the determined co-occurrences.

Ranking means may be provided for ranking the parts or portions, typically sentences, of the document data in accordance with a scoring function with the output means being arranged to output the highest ranking part or portions.

In this aspect, the co-occurrences need not necessarily be calculated in the manner as described above but may be calculated using different grammatical categories of words and different definitions of co-occurrence.

In one aspect the present invention provides apparatus for classifying topics in document data, which apparatus comprises:
  text splitting means for splitting document data into text segments; and
  classifying means for classifying topics in the document data according to the distribution in the text segments so as to define main and subsidiary topics in the document data.

As described above, the classifying means is arranged to determine that a topic is a main topic if the topic occurs in a predetermined percentage of the text segments and to classify any topics not meeting this requirement as subsidiary or lesser topics. Other ways of identifying main topics may be used. For example a topic that occurs frequently in the first and/or last text segments may be considered to be a main topic.

In an embodiment the classifying means is arranged to weight a topic in accordance with the position of the text segment containing the topic so that a topic occurring in the first and/or last text segment is given a higher weighting than topics occurring in the other text segments.

In one aspect, the present invention provides topic classifying means for classifying topics in a document by identifying a topic as being a child or subsidiary topic of another topic when the text portions in which that subsidiary topic occurs represent a sub-set of the text portions in which the said other topic occurs. These text portions may be the text segments mentioned above or may be actual paragraphs within the original document data.

This aspect provides a way of easily categorising topics in a document so that a user can be provided with a document summary which indicates the relative importance in the summarised document data of the different identified topics.

In the embodiments described above the subsidiary topic is generally a topic that is of lesser importance than a main topic and does not necessary constitute a sub-set of a main topic.

In one aspect the present invention provides apparatus for selecting sentences for use in a text summary wherein the apparatus comprises:
  topic weight assigning means for assigning weights to each topic in document data to be summarised;
  sentence weight assigning means for assigning a weight to each sentence in the document data
  scoring means for scoring each sentence in the document data by summing the assigned weights;
  selecting means for selecting the sentences having the highest score;
  topic re-weighting means for re-weighting the topics to reduce the weight allocated to topics in this elected sentence; and
  control means for causing the scoring, selecting and re-weighting means to repeat the above operations until a certain number of sentences has been selected from the document data.

This aspect provides for dynamic re-scoring of the sentences each time a sentence is selected to ensure that at least one sentence is selected for each topic identified in the document data. The topics themselves may be identified as described above or using any other know topic identification method.

In one aspect the present invention provides apparatus for providing a short or capsule summary of document data, which apparatus comprises;

receiving means for receiving data representing the topic or topics in the document data;

locating means for locating for each word in the or each topic all words that co-occur with that word in the document data; and outputting means for outputting as a capsule short summary text data in which topic is associated with subsidiary items comprising locating co-occurring words.

In this aspect, the topics may be identified in a manner described above or using any know topic identification means. Similarly co-occurrences may be identified as described or may be identified in a different manner, for example, by identifying different grammatical categories of words.

The above aspect enables provision of a short or capsule summary suitable for display on a small area display such as that of a PDA or mobile telephone.

In an embodiment, further locating means are provided for locating all words that co-occur with the subsidiary items and the output means is arranged to associate each such co-occurring word with the corresponding subsidiary item to provide the user with further information regarding the document data yet still in a short or capsule forms suitable for display on a small area display.

In an embodiment, filtering means are provided for filtering the co-occurring words to select those co-occurring words that themselves have highly rated co-occurrences with the subsidiary items to ensure that the selected co-occurring words are relevant to the subsidiary items.

In one aspect the present invention provides apparatus for modifying chunks of sentences selected for a document data summary, which apparatus comprises:

chunk identifier means for identifying chunks that do not contain words in a selected topic list;

chunk modifying means for modifying the identified chunks; and output means for outputting the document summary with the identified chunks modified by the chunk modifying means.

This aspect enables chunks that do not appear to be of significance for selected topics to be de-emphasised relative to the remaining chunks. As described above, the chunks are modified by replacing them by ellipsis. As alternative possibilities, the chunks may be retained but de-emphasised, for example by showing them in a smaller font size or by showing the unmodified chunks in bold typeface and the modified chunks by normal typeface. As a further possibility, the modified chunks may be shown in a different colour from the unmodified chunks. As a further possibility, the chunks may be omitted and syntactic or semantic processing carried out to ensure sentence coherence or cohesion.

As described above, chunking is effected by using punctuation marks to define the bounds of the chunks. As another possibility, syntactic analysis may be used to define the chunks.

The word frequency calculator may be arranged to calculate word frequencies only for words in certain grammatical categories, for example the grammatical categories used by the co-occurrence significance calculator.

As described above, when the concept fuser 14 is present, the word frequency calculator 15 may calculate the frequency of words in the part-of-speech tagged data or calculate the frequency of concepts provided by the concept fuser. In addition, the co-occurrence calculator 16 may calculate co-occurrences of words in the tagged data or co-occurrences of concepts provided by the concept fuser 14. Generally, word frequency calculator and co-occurrence calculator will both use either the part-of-speech tagged data or the output of the concept fuser. However, it is possible that one of these modules may use the part-of-speech tagged data and the remaining one may use the output of the concept fuser.

As described above, the concept fuser uses a lexical database such as WordNet to identify synonyms in or relating to the part-of-speech tagged data as conceptually identical and defines these synonyms as the concepts. Where the lexical database provides the necessary data, then the concept fuser 14 may be arranged also to identify as conceptually identical hypernyms and hypomyms.

Also, in the embodiments described above, the concept fuser 14 is arranged to identify concepts using only the nouns in the tagged data. As a further possibility, the concept fuser may carry out the concept fusing process using other word categories such as verbs or even across categories, for example equating words having the same stem such as "leading" and "leader" as conceptually identical. As another possibility the concept fuser 14 need not necessarily access a lexical database to identify synonyms or the like but may simply recognise words having the same stem as being different forms of the same words so that, for example, "leads", "leading", "led" and "leader" may be recognised as different forms of the same word.

As described above, the coherence significance calculator 16 ignores the order of the words in the co-occurrences. This enables better results to be obtained where there is sparse data or where the text is written in language in which word order is variable enough to make any different in order statistically insignificant. However, where there is a lot of data or the document data is in a language in which word order is more significant, then the co-occurrence calculator may take account of the order of the words in the co-occurrence pairs.

As described above, the co-occurrence significance calculator identifies as co-occurrences combinations of nouns, verbs and proper nouns. In the particular example given, five categories of co-occurrence are considered; noun and verb, noun and noun, noun and proper noun, verb and proper noun and proper noun and proper noun, regardless of the order in which the words occur. It may however be possible to omit one or more of these categories or to add other categories.

In the above described embodiments, the significance of co-occurrence pairs is calculated using the likelihood ratio. However other forms of standard significance measure can be used as discussed in the aforementioned document by T. Dunning.

It will, of course, be appreciated that FIG. 1 shows only one possible configuration for the text summarising apparatus and that other configurations are possible, Thus, for example, the controller 2 may be omitted and each of the remaining modes arranged to output data directly to the succeeding module or modules in accordance with the data flow shown in FIG. 3.

It will also be appreciated that the functions carried out by the various modules shown in FIGS. 1 and 3 may be different distributed. Thus, for example, although in the above described embodiment ranking of words, co-occurrences and phrases is carried out by the topic determiner, these ranking operations may be carried out by the word frequency calculator, co-occurrence significance calculator and phrase chunker, respectively, or one or more of the word frequency calculator, co-occurrence significance calculator and phrase chunker may carry out the related ranking task and the topic determiner carry out the remaining ranking tasks.

Also although in the above described embodiments the chunk modifier is provided as a separate module from the summary provider, this need not necessarily be the case and the summary provider may be arranged to conduct the chunk modification.

As described above the text summarising apparatus 1 shown in FIG. 1 may be provided by programming a single computing apparatus. This need not necessarily be the case and, for example, one or more of the various different modules shown in FIG. 1 may be provided by programming different computing apparatus that communicate directly or over a network. For example, a the tokeniser 11, part of speech tagger and phrase checker 13 may be provided by a separate computing apparatus.

As described above, the summary provider 2 is configured to provide data suitable for display on a display such as a CRT (Cathode Ray Tube) or LCD (Liquid Crystal Device) display. As another possible or additionally, the summary provider 2 may be arranged to provide the resulting summary in a format suitable for printing by the printer 41 and/or by a remote printer coupled to the text summarising apparatus via the communications device 60. Alternatively or additionally, the summary provider 2 may be arranged to provide the summary data in a form which can be converted from text to speech by text-to-speech conversion software for output in an audio form to a user via, for example, the loudspeaker 43.

Similarly, if the data provider 10 has access to speech recognition software, the user may input data using the microphone 53.

The document data to be summarised by the text summarising apparatus may comprise a collection or a number of collections of different documents which may be in the form of newspaper articles, papers, journals and the like or may comprise a single document such as a textbook, encyclopaedia or the like. The document data may be stored in the mass storage device, downloaded via the communications device or from a removable medium, input by the user using an input device or accessed remotely so that the data is not stored at the apparatus or any combination of these.

The invention claimed is:

1. An apparatus including a processor to identify topics of document data, the apparatus comprising:
 a word ranker configured to rank words that are present in or representative of content of the document data;
 a co-occurrence ranker configured to rank co-occurrences of words that are present in or representative of the content of the document data;
 a phrase ranker configured to rank phrases in the document data;
 a words selector configured to select the words with a highest ranking;
 a co-occurrence identifier configured to identify which of the co-occurrences with a highest ranking contain at least one of the highest ranking words;
 a phrase identifier configured to identify the phrases containing at least one word from the identified co-occurrences by concatenating consecutive nouns, concatenating consecutive proper nouns, and concatenating consecutive adjectives with a final noun;
 a phrase selector configured to select one or ones of the identified phrases with a highest ranking as a topic or topics of the document data; and
 an outputter configured to output data relating to the selected topics.

2. The apparatus of claim 1, wherein the words selector is configured to select as the highest ranking words a predetermined number of the highest ranking words, a number of the highest ranking words that represents a predetermined percentage of the words in the document data, or a number of the highest ranking words that represents a predetermined percentage of the number of ranked words.

3. The apparatus of claim 1, wherein the co-occurrence identifier is configured to select as the highest ranking co-occurrences a predetermined number of co-occurrences, a number of the highest ranking co-occurrences that represents a predetermined percentage of the co-occurrences in the document data, or a number of the highest ranking co-occurrences that represents a predetermined percentage of the number of ranked co-occurrences.

4. The apparatus of claim 1, wherein the phrase selector is configured to select as the highest ranking identified phrases a predetermined number of the identified phrases, a number of the highest ranking identified phrases that represents a predetermined percentage of the identified phrases in the document data, or a number of the highest ranking identified phrases that represents a predetermined percentage of the number of ranked phrases.

5. The apparatus of claim 1, wherein at least one of the word ranker, co-occurrence ranker, and phrase ranker is configured to weight the items to be ranked in accordance with their position in the document data.

6. The apparatus of claim 1, further comprising a co-occurrence determiner configured to determine word co-occurrences in the document data by identifying, as co-occurrences, word combinations comprising words in particular grammatical categories.

7. The apparatus of claim 6, wherein the co-occurrence determiner is configured to ignore the order of the words in the word combinations.

8. The apparatus of claim 1, further comprising a co-occurrence determiner configured to determine word co-occurrences in the document data by identifying as co-occurrences at least some of the following combinations:
 noun and verb;
 noun and noun;
 noun and proper noun;
 verb and proper noun;
 and proper noun and proper noun.

9. The apparatus of claim 1, wherein the co-occurrence ranker is configured to rank significant co-occurrences and the apparatus further comprises a co-occurrence determiner configured to determine word co-occurrences in the document data by identifying as co-occurrences word combinations comprising words in particular grammatical categories and a significance calculator configured to calculate a significance measure for the identified co-occurrences.

10. The apparatus of claim 1, wherein the co-occurrence ranker is configured to rank significant co-occurrences and the apparatus further comprises a co-occurrence determiner configured to determine word co-occurrences in the document data by identifying as co-occurrences at least some of the following combinations:

noun and verb;
noun and noun;
noun and proper noun;
verb and proper noun; and
proper noun and proper noun, and a significance calculator configured to calculate a significance measure for the identified co-occurrences.

11. The apparatus of claim 1, further comprising:
a text splitter configured to split the document data into text segments; and
a classifier configured to classify the selected topics of a distribution in the text segments, to define main and subsidiary topics in the document data, wherein the outputter is configured to output data relating to the classified topics.

12. The apparatus of claim 1, further comprising a summary provider configured to provide summary data on the basis of the selected topics, wherein the outputter is configured to output the summary data.

13. The apparatus of claim 12, wherein the summary provider comprises a sentence selector configured to select sentences for use in the summary data.

14. The apparatus of claim 13, wherein the sentence selector comprises:
a topic weight assigner configured to assign weights to the topics;
a sentence weight assigner configured to assign weights to sentences in the document data;
a scorer configured to score the sentences by summing the assigned topic and sentence weights;
a selector configured to select the sentence or sentences having the highest score or scores;
a topic weight adjuster configured to relatively reduce the weight allocated to the topic or topics in the selected sentence or sentences; and
a controller configured to cause the scorer, selector and topic weight adjuster to repeat the above operations until a predetermined number of sentences has been selected for the summary from the document data.

15. The apparatus of claim 13, further comprising:
a chunk identifier configured to identify in sentences selected for a summary chunks that do not contain words in the selected topics; and
a chunk modifier configured to modify the identified chunks.

16. The apparatus of claim 15, wherein the chunk modifier is configured to modify chunks by causing them to be displayed, to place less emphasis on the modified chunks.

17. The apparatus of claim 1, further comprising a concept identifier configured to identify from the document data concepts that determine words representative of the content of the document data.

18. An apparatus including a processor to identify topics of document data, the apparatus comprising:
a word ranker configured to rank words that are present in or representative of the content of the document data;
a co-occurrence ranker configured to rank co-occurrences of words that are present in or representative of the content of the document data;
a phrase ranker configured to rank phrases in the document data;
a words selector configured to select the highest ranking words;
a co-occurrence identifier configured to identify which of the highest ranking co-occurrences contain at least one of the highest ranking words;
a phrase identifier configured to identify the phrases containing at least one word from the identified co-occurrences;
a phrase selector configured to select the highest ranking one or ones of the identified phrases as the topic or topics of the document data;
an outputter configured to output data relating to the selected topics;
a text splitter configured to split the document data into text segments;
a classifier configured to classify the selected topics of the distribution in the text segments which define main and subsidiary topics in the document data, wherein the outputter is configured to output data relating to the classified topics; and
a topic hierarchy identifier configured to identify a topic as being a child or subsidiary topic of another topic when text portions in which that subsidiary topic occurs represent a sub-set of the text portions in which the said other topic occurs, wherein the outputter is configured to output data relating to the identified topic hierarchy.

19. The apparatus of claim 18, wherein the classifier is configured to determine that a topic is a main topic when the topic occurs in a predetermined percentage of the text segments and to classify any topic not meeting this requirement as a subsidiary or lesser topic.

20. The apparatus of claim 18, wherein the classifier is configured to weight a topic in accordance with a position in the document data of the text segment containing the topic.

21. The apparatus of claim 18, wherein the classifier is configured to weight a topic in accordance with a position in the document data of the text segments containing the topic, wherein a topic occurring in at least one of a first and last text segment of document data representing a document is given a higher weighting than topics occurring in the other text segments.

22. An apparatus including a processor to identify topics of document data, the apparatus comprising:
a word ranker configured to rank words that are present in or representative of the content of the document data;
a co-occurrence ranker configured to rank co-occurrences of words that are present in or representative of the content of the document data;
a phrase ranker configured to rank phrases in the document data;
a words selector configured to select the highest ranking words;
a co-occurrence identifier configured to identify which of the highest ranking co-occurrences contain at least one of the highest ranking words;
a phrase identifier configured to identify the phrases containing at least one word from the identified co-occurrences;
a phrase selector configured to select the highest ranking one or ones of the identified phrases as the topic or topics of the document data;
an outputter configured to output data relating to the selected topics;
a text splitter configured to split the document data into text segments;
a classifier configured to classify the selected topics of the distribution in the text segments which define main and subsidiary topics in the document data, wherein the outputter is configured to output data relating to the classified topics; and
a topic hierarchy identifier configured to identify a topic as being a child or subsidiary topic of another topic when the text segments in which that subsidiary topic occurs represent a sub-set of the text segments in which the said other topic occurs, wherein the outputter is configured to output data relating to the identified topic hierarchy.

23. An apparatus including a processor to identify topics of document data, the apparatus comprising:
   a word ranker configured to rank words that are present in or representative of content of the document data;
   a co-occurrence ranker configured to rank co-occurrences of words that are present in or representative of the content of the document data;
   a phrase ranker configured to rank phrases in the document data;
   a words selector configured to select the highest ranking words;
   a co-occurrence identifier configured to identify which of the highest ranking co-occurrences contain at least one of the highest ranking words;
   a phrase identifier configured to identify the phrases containing at least one word from the identified co-occurrences;
   a phrase selector configured to select the highest ranking one or ones of the identified phrases as the topic or topics of the document data; and
   a summary provider configured to provide summary data on the basis of the selected topics, wherein the summary provider comprises a sentence selector configured to select sentences to use in the summary data;
   wherein the sentence selector comprises:
      a topic weight assigner configured to assign weights to the topics;
      a sentence weight assigner configured to assign weights to sentences in the document data;
      a scorer configured to score the sentences by summing the assigned topic and sentence weights;
      a selector configured to select the sentence or sentences having the highest score or scores;
      a topic weight adjuster configured to relatively reduce the weight allocated to the topic or topics in the selected sentence or sentences, wherein the topic weight adjuster is configured to set to zero the weight of any topic in the selected sentence or sentences;
      a controller configured to cause the scorer, selector and topic weight adjuster to a controller configured to cause the scorer, selector and topic weight adjuster to repeat the above operations until a predetermined number of sentences has been selected for the summary from the document data; and
   an outputter configured to output the summary data.

24. The apparatus of claim 23, wherein the sentence selector comprises:
   a topic weight assigner configured to assign weights to the topics;
   a sentence weight assigner configured to assign weights to sentences in the document data;
   a scorer configured to score the sentences by summing the assigned topic and sentence weights; and
   a selector configured to select the sentence or sentences having the highest score or scores for the summary.

25. The apparatus of claim 23, wherein the summary provider comprises a locater configured to locate words present in or representative of the content of the document data that co-occur with words in the topics; and
   the outputter is configured to output summary data in which the or each topic is associated with subsidiary items comprising located co-occurring words.

26. The apparatus of claim 23, wherein the summary provider further comprises a further locater configured to locate all words present in or representative of the content of the document data that co-occur with the subsidiary items and the outputter is configured to associate each such co-occurring word with the corresponding subsidiary item in the summary data.

27. The apparatus of claim 23, wherein the summary provider further comprises a filter configured to filter the co-occurring words to select for the summary data those co-occurring words that themselves have co-occurrences with the subsidiary items.

28. The apparatus of claim 23, wherein the concept identifier is configured to identify as concepts at least one of synonyms, hypernyms and hyponyms in or relating to the document data.

29. The apparatus of claim 23, wherein the concept identifier is configured to access a lexical database to identify as concepts at least one of synonyms, hypernyms and hyponyms in or relating to the document data.

30. An apparatus including a processor to identify topics of document data, the apparatus comprising:
   a word ranker configured to rank words that are present in or representative of the content of the document data;
   a co-occurrence ranker configured to rank co-occurrences of words that are present in or representative of the content of the document data;
   a phrase ranker configured to rank phrases in the document data;
   a words selector configured to select the highest ranking words;
   a co-occurrence identifier configured to identify which of the highest ranking co-occurrences contain at least one of the highest ranking words;
   a phrase identifier configured to identify the phrases containing at least one word from the identified co-occurrences;
   a phrase selector configured to select the highest ranking one or ones of the identified phrases as the topic or topics of the document data;
   a summary provider configured to provide summary data on the basis of the selected topics, wherein the summary provider comprises a sentence selector configured to select sentences to use in the summary data;
   a chunk identifier configured to identify in sentences selected for a summary chunks that do not contain words in the selected topics; and
   a chunk modifier configured to modify the identified chunks wherein the chunk modifier is configured to modify chunks by causing them to be displayed which place less emphasis on the modified chunks; and
   an outputter configured to output the summary data,
   wherein the outputter is configured to output the summary data and the chunk modifier is configured to modify chunks to cause, when the outputter provides output data for display by a display, the modified chunks to be displayed using at least one of a smaller font size, a different font, a different font characteristic and a different font colour from the other chunks.

31. The apparatus of claim 30, wherein the chunk modifier is configured to modify chunks by replacing them by ellipsis.

32. The apparatus of claim 30, wherein the chunk modifier is configured to remove the identified chunks.

33. The apparatus of claim 30, further comprising a processor configured to carry out syntactic or semantic processing on sentences from which chunks have been removed to maintain sentence coherence or cohesion.

34. The apparatus of claim 30, wherein the chunk identifier is configured to identify chunks by using punctuation marks to define bounds of the chunks.

35. A method to identify topics of document data, the method comprising the steps of:
- ranking words that are present in or representative of content of the document data;
- ranking co-occurrences of words that are present in or representative of the content of the document data;
- ranking phrases in the document data;
- selecting the words with a highest ranking;
- identifying which of the co-occurrences with a highest ranking contain at least one of the highest ranking words;
- identifying the phrases containing at least one word from the identified co-occurrences by concatenating consecutive nouns, concatenating consecutive proper nouns, and concatenating consecutive adjectives with a final noun;
- selecting one or ones of the identified phrases with a highest ranking as the topic or topics of the document data; and
- outputting data relating to the selected topics.

36. A computer-executable program stored on a computer-readable storage medium, the program when executed by a computer, performing the steps of:
- ranking words that are present in or representative of content of the document data;
- ranking co-occurrences of words that are present in or representative of the content of the document data;
- ranking phrases in the document data;
- selecting the words with a highest ranking;
- identifying which of the co-occurrences with a highest ranking contain at least one of the highest ranking words;
- identifying the phrases containing at least one word from the identified co-occurrences by concatenating consecutive nouns, concatenating consecutive proper nouns, and concatenating consecutive adjectives with a final noun;
- selecting one or ones of the identified phrases with a highest ranking as the topic or topics of the document data; and
- outputting data relating to the selected topics.

* * * * *